(12) United States Patent
Shimodaira

(10) Patent No.: US 10,330,247 B2
(45) Date of Patent: Jun. 25, 2019

(54) FRAME STRUCTURE, AND STRUCTURE

(71) Applicant: MARIO DEL MARE Architect inc., Zushi-shi, Kanagawa (JP)

(72) Inventor: Mario Shimodaira, Zushi (JP)

(73) Assignee: MARIO DEL MARE ARCHITECT INC., Kanagawa (JP)

( * ) Notice: Subject to any disclaimer, the term of this patent is extended or adjusted under 35 U.S.C. 154(b) by 0 days.

(21) Appl. No.: 15/740,138

(22) PCT Filed: Jun. 22, 2016

(86) PCT No.: PCT/JP2016/003011
§ 371 (c)(1),
(2) Date: Dec. 27, 2017

(87) PCT Pub. No.: WO2017/002332
PCT Pub. Date: Jan. 5, 2017

(65) Prior Publication Data
US 2018/0187826 A1    Jul. 5, 2018

(30) Foreign Application Priority Data

Jun. 29, 2015  (WO) ................. PCT/JP2015/003245
Dec. 25, 2015  (JP) ................................ 2015-253996

(51) Int. Cl.
*E04B 1/19* (2006.01)
*F16M 11/38* (2006.01)
(Continued)

(52) U.S. Cl.
CPC ............. *F16M 11/38* (2013.01); *B64G 1/222* (2013.01); *E04B 1/344* (2013.01); *E04B 1/3441* (2013.01);
(Continued)

(58) Field of Classification Search
CPC ................. E04B 1/1903; E04B 1/1909; E04B 2001/1927; E04B 1/344; E04B 1/3445;
(Continued)

(56) References Cited

U.S. PATENT DOCUMENTS 3,252,469 A * 5/1966 Peake ..................... A45B 23/00
135/25.31
4,030,102 A * 6/1977 Kaplan ................ H01Q 15/161
136/245
(Continued)

FOREIGN PATENT DOCUMENTS

CN         102167165 A    8/2011
JP         H03-248607 A   11/1991
(Continued)

OTHER PUBLICATIONS

International Search Report and Written Opinion, International Patent Application No. PCT/JP2016/003011, dated Sep. 13, 2016, with English translation of Search Report (11 pages).
(Continued)

*Primary Examiner* — Brian E Glessner
*Assistant Examiner* — Daniel J Kenny
(74) *Attorney, Agent, or Firm* — Hamre, Schumann, Mueller & Larson, P.C.

(57) ABSTRACT

[Problem] To provide a foldable frame structure, unfoldable into a 2N-sided polygonal shape (N being an integer equal to or larger than 2), achieving a securely and rigidly supported unfolded state and a compact folded state.
[Solving means] 2N upper rods (210), with an equal length, are coupled to each other to define a planer 2N-sided polygonal shape. First coupling means (220) coupling two adjacent upper rod (210) at a corresponding one of apices of the 2N-sided polygonal shape, and holding the two upper rod (210) in such a manner that the upper rod (210) are
(Continued)

rotatable about an orthogonal axis orthogonal to axes of both of the two rods and rotation means (240) that enable each of the upper rods (210) to rotate about the axis (AX1) are provided. Folding to be a columnar shape as a whole can be achieved with the upper rods (210) pivoted about the orthogonal axis (AX2) to minimize an angle between two adjacent upper rods (210) while the upper rods (210) are rotated about the axis (AX1).

5 Claims, 30 Drawing Sheets

(51) Int. Cl.
*E04B 1/344* (2006.01)
*F16S 3/06* (2006.01)
*E04H 15/48* (2006.01)
*F16M 11/24* (2006.01)
*B64G 1/22* (2006.01)
*A63B 5/11* (2006.01)
*F16S 5/00* (2006.01)
*B64G 1/66* (2006.01)

(52) U.S. Cl.
CPC ............. *E04H 15/48* (2013.01); *F16M 11/24* (2013.01); *F16S 3/06* (2013.01); *A63B 5/11* (2013.01); *B64G 1/66* (2013.01); *F16S 5/00* (2013.01)

(58) Field of Classification Search
CPC ........... E04B 1/3533; E04B 2001/1921; E04B 2001/1957; A47D 13/063; A47D 13/061
USPC .......................................... 135/147; 403/170
See application file for complete search history.

(56) References Cited

U.S. PATENT DOCUMENTS

| | | | |
|---|---|---|---|
| 5,787,671 A | 8/1998 | Meguro et al. | |
| 5,797,695 A * | 8/1998 | Prusmack | E04H 15/32 135/145 |
| 6,028,570 A * | 2/2000 | Gilger | H01Q 1/288 343/880 |
| 6,378,265 B1 * | 4/2002 | Konstandt | E04B 1/1903 403/171 |
| 6,865,756 B2 * | 3/2005 | Clapper | A47D 13/063 5/98.1 |
| 8,166,986 B2 * | 5/2012 | Ma | A45B 25/10 135/19.5 |
| 8,650,678 B2 * | 2/2014 | Thorne | A47D 13/061 5/93.1 |
| 2003/0145552 A1 | 8/2003 | Yamawaki | |
| 2018/0094424 A1 * | 4/2018 | Gutierrez | E04B 1/1903 |

FOREIGN PATENT DOCUMENTS

| | | |
|---|---|---|
| JP | H08-186424 A | 7/1996 |
| JP | H10-098318 | 4/1998 |
| JP | H11-293777 A | 10/1999 |
| JP | 2000-027302 A | 1/2000 |
| JP | 2003-226299 A | 8/2003 |
| JP | 2007-275405 A | 10/2007 |
| JP | 2014-201924 A | 10/2014 |
| WO | 2009/153454 | 12/2009 |

OTHER PUBLICATIONS

International Search Report, International Patent Application No. PCT/JP2015/003245, dated Sep. 15, 2015 (2 pages).

* cited by examiner

FRAME STRUCTURE, AND STRUCTURE

TECHNICAL FIELD

The present invention relates to a foldable frame structure, and more particularly relates to a foldable frame structure unfoldable into a 2N-sided (even number) polygonal shape having four corners or more and applicable to a structure, an architecture, recreational equipment, and a furniture.

BACKGROUND ART

Conventionally, foldable frame structures for supporting a structure, an architecture, and the like have been known. For example, such a foldable frame structure enables a structure to be temporarily disposed on a rough and uneven ground, without the need for leveling the ground. The frame structure is preferable in terms of nature conservation and can be used for a floor structure for a temporary housing used during disaster, and thus is attracting much attentions.

Patent Document 1 discloses a frame structure on which a flat supporting plate can be placed. This frame structure is formed by combining an upper frame and a lower frame each having a pyramid shape and including three rod-shaped members. This foldable frame structure is usable for purposes other than supporting a structure, an architecture, and the like.

Patent Document 2 discloses a structure of a jumping portion for recreational equipment and exercise equipment such as a trampoline. Patent Document 3 discloses a space structure to be used outside the earth's atmosphere. The foldable frame structure can also be used for wide variety of applications such as a tent or the like.

CITATION LIST

Patent Document

Patent document 1: JP-A-2014-201924
Patent document 2: JP-A-2007-275405
Patent document 3: JP-A-H11-293777

SUMMARY OF THE INVENTION

Problems to be Solved by the Invention

The foldable frame structure usable for a wide range of applications has been increasingly demanded to have higher performances for securely supporting a heavy object in an unfolded state and being in a compact folded state. The configuration disclosed in Patent Document 1 is for supporting a supporting plate at three points with three rod-shaped members. Thus, the supporting plate placed thereon is not necessarily held with sufficient stability.

The technique disclosed in Patent Document 2 merely enables the jumping portion to be folded in about three to be stored. This might not necessarily be regarded as compact folding. The configuration disclosed in Patent Document 3 is supposed to be used in a zero-gravity space and thus does not necessarily provide high rigidity sufficient for supporting a heavy weight.

In view of the above situation, an object of the present invention is to provide a foldable frame structure unfoldable into a 2N-sided polygonal shape having four corners or more that can achieve stable supporting and high rigidity in the unfolded state and a compact folded state.

Means for Solving the Problems

To solve the problems described above, a first frame structure according to the present invention is a foldable frame structure that is unfoldable into a planar regular 2N-sided (N being an integer equal to or larger than 2) polygonal shape (hereinafter simply referred to as "2N-sided polygonal shape") defined with 2N rods with an equal length coupled to each other. The first frame structure includes coupling means each disposed at a corresponding one of apices of the 2N-sided polygonal shape, coupling two adjacent ones of the rods at the apex, and holding end portions of the two rods in such a manner that the rods are rotatable about an orthogonal axis orthogonal to axes of both of the two rods, and rotation means that enable each of the rods to rotate about the axis relative to at least one of two of the coupling means that hold both end portions of the rod. The foldable frame structure as a whole is foldable into a columnar shape with the rods pivoted about the orthogonal axis to minimize an angle between two adjacent ones of the rods while rotating about the axis.

A second frame structure according to the present invention is a foldable frame structure that is unfoldable into a planar 2N-sided (N being an integer equal to or larger than 2) polygonal shape defined with 2N rods with an equal length coupled to each other. The second frame structure includes coupling means each disposed at a corresponding one of apices of the 2N-sided polygonal shape, coupling two adjacent ones of the rods at the apex, and holding end portions of the two rods in such a manner that the rods are rotatable about an orthogonal axis orthogonal to axes of both of the two rods. Each of the rods is divided, at a portion of the rod in a longitudinal direction, into sections relatively rotatable with each other about the axis of the rod. The frame structure as a whole is foldable into a columnar shape with the rods pivoted about the orthogonal axis to minimize an angle between two adjacent ones of the rods while rotating about the axis.

The term "end portion" indicates a portion, at an end of the rod, held by the coupling unit. The expression "rods are rotatable about an orthogonal axis orthogonal to axes of both of the two rods" indicates that two adjacent rods are configured to have an angle between the two rods decreased and increased.

The expression "enable each of the rods to rotate about the axis relative to at least one of two of the coupling means that hold both end portions of the rod" indicates a configuration in which one of the end portions of the rod is fixed to the coupling unit and the rod can rotate about the axis relative to the coupling unit on the other end side, or a configuration in which both end portions of the rod are not fixed to the coupling means and thus can rotate about the axis relative to the coupling means on both end sides. The configuration to be employed may be changed as appropriate.

The expression "the rods pivoted about the orthogonal axis to minimize an angle between two adjacent ones of the rods while rotating about the axis" indicates that the rods are rotated about the orthogonal axis to approach each other while rotating about the axis.

The expression "each of the rods is divided, at a portion of the rod in a longitudinal direction, into sections relatively rotatable with each other about the axis of the rod" indicates that at least two sections of the rod, which are obtained by the dividing, are configured to rotate relative to each other.

Preferably, the first and second frame structures according to the present invention each further include a flexible 2N-sided polygonal sheet having a substantially same size as the 2N-sided polygonal shape, and the sheet has sides suspended across the rods.

The term "sheet has sides suspended across the rods" as used in the present invention indicates a state where an inner side portion of the 2N-sided polygonal shape is covered with a flexible sheet. Each side of the sheet may be directly fixed to a corresponding one of the rods or may be joined to the rod using another member such as a string material, as long as each rod can rotate about the axis. The configuration to be employed may be changed as appropriate.

The frame structures according to the present invention may further include upper rods each having a lower end coupled to a corresponding one of the coupling means and an upper end positioned above the 2N-sided polygonal shape, the upper rods erecting so as to being foldable, toward an inner side of the 2N-sided polygonal shape, about the coupling means, lower rods each having an upper end coupled to a corresponding one of the coupling means and a lower end positioned below the 2N-sided polygonal shape, the lower rods erecting so as to being foldable, toward the inner side of the 2N-sided polygonal shape, about the coupling means, a single string material joining the upper ends of the upper rods and the lower ends of the lower rods with each other, and a tension application unit that applies tension to the string material.

The expression "foldable, toward an inner side of the 2N-sided polygonal shape" as used in the present invention indicates that folding toward the center of the "2N-sided polygonal shape" is possible. The term "tension application unit" as used in the present invention may be any configuration that can apply tension to a string material. For example, the tension may be applied with the string material wound using a roller.

In the frame structures according to the present invention, the tension application unit may be a tension lever having a first end supported by an outer facing portion, close to one of the coupling means, on any one of the coupling unit, the upper rod, and the lower rod to be rotatable about an axis in parallel with a plane of the 2N-sided polygonal shape and orthogonal to a line connecting between a center of the 2N-sided polygonal shape and the outer facing portion, and a second end each slidably engaged with an intermediate portion of the string material.

The expression "a first end supported by an outer facing portion, close to one of the coupling means, on any one of the coupling unit, the upper rod, and the lower rod to be rotatable about an axis in parallel with a plane of the 2N-sided polygonal shape and orthogonal to a line connecting between a center of the 2N-sided polygonal shape and the outer facing portion" as used in the present invention indicates that the second end of the tension lever is movable in an upper and lower direction on the outer side of any one of the coupling unit, the upper rod, and the lower rod. The term "close to one of the coupling means" as used in the present invention indicates a range between a position at ⅔ from the upper end of the upper rod and a position at ⅔ from the lower end of the lower rod including the coupling unit.

The frame structures according to the present invention may further include second string materials having first ends coupled to the upper ends of the upper rods and the lower ends of the lower rods at a position corresponding to each of the coupling means and having second ends coupled to intermediate portions of two of the rods adjacent to the coupling unit while being tensioned.

The term "intermediate portion" as used in the present invention indicates a position between a position, at ⅓ of the distance between the first coupling unit and an adjacent second coupling unit, and the adjacent second coupling unit. The term "coupled . . . while being tensioned" indicates any state where the tension is applied to the second string materials with the tension applied to the string material by means of the tension lever. The second string materials may not be tensioned in a state where no tension is applied to the string material, that is, a state where the upper rods or the lower rods are not fully unfolded, for example.

A third frame structure according to the present invention is a foldable frame structure that is unfoldable into a planar regular 2N (N being an integer equal to or larger than 3) polygonal shape defined with 2N rods coupled to each other. The third frame structure includes coupling means provided in an alternating pattern to apices of the regular 2N-sided polygonal shape, the coupling means each coupling two adjacent ones of the rods at the apex and holding first end portions of the two rods in such a manner that the rods are rotatable about an orthogonal axis orthogonal to axes of both of the two rods, second coupling means provided in an alternating pattern to be provided to apices without the coupling means, the second coupling means coupling the rods with each other, the second coupling means holding second end portions of the rods in such a manner as to enable the rods to rotate about a diagonal axis of the regular 2N-sided polygonal shape, the diagonal axis being inclined by an angle $(180/2N)°$ relative to the axis of each of the rods, and rotation means that enable the rods to rotate about the axis. The frame structure as a whole in the unfolded state is foldable into a columnar shape with the rods folded toward an inner side of the regular 2N-sided polygonal shape about the diagonal axis and about the orthogonal axis to approach each other while rotating about the axis.

The term "regular 2N-sided polygonal shape" as used in the present invention is not limited to a regular 2N-sided polygonal shape having sides with the exact same mathematical length, and includes a 2N-sided polygonal shape having sides with substantially the same length. The term "into a planar regular 2N polygonal shape defined with rods coupled to each other" indicates a state where a planer regular 2N polygonal shape is defined with rods, for the regular 2N-sided polygonal shape, coupled to each other while being substantially circularly arranged.

The term "provided in an alternating pattern to apices of the regular 2N-sided polygonal shape" indicates that N objects are alternately provided to the apices. The term "apices without the coupling means" indicates N apices, in 2N apices, where no "coupling unit" is provided.

The term "end portion" indicates a portion, at an end of the rod, held by the coupling unit. The expression "folded toward an inner side of the regular 2N-sided polygonal shape" indicates folding toward the center of the "regular 2N-sided polygonal shape" from the unfolded state.

The frame structure according to the present invention may further include a flexible regular 2N-sided polygonal sheet having a substantially same size as the regular 2N-sided polygonal shape, and the sheet may have sides suspended across the rods.

The term "sheet has sides suspended across the rods" as used in the present invention indicates a state where an inner side portion of the regular 2N-sided polygonal shape is covered with a flexible sheet. Each side of the sheet may be directly fixed to a corresponding one of the rods or may be joined to the rod using another member such as a rope, a string material, a hook-and-loop fastener, or the like, as long as each rod is rotatable about the axis. The configuration to be employed may be changed as appropriate.

In the frame structures according to the present invention, each of the coupling means may include a lock mechanism that locks rotation of the rods coupled to the coupling unit about the orthogonal axis.

A structure according to the present invention includes a plurality of the above-described first or second frame structure arranged at intervals in a direction orthogonal to a plane including the 2N-sided polygonal shape, and a plurality of struts coupling and fixing apices of the 2N-sided polygonal shapes of two adjacent ones of the frame structures to each other.

Advantageous Effects of Invention

The first and the second frame structures according to the present invention are unfolded into a planer 2N-sided polygonal shape defined with 2N (N being an integer equal to or larger than 2) rods with equal length. Thus, the supporting plate can be securely and rigidly supported with the rods defining the sides of the 2N-sided polygonal shape. When the rods are pivoted about the orthogonal axis to minimize the angle between two adjacent rods while the rods are rotating about the axis in the unfolded state, the frame structure according to the present invention can be folded into a columnar shape as a whole, and thus can be stored in a compact manner.

The third frame structure according to the present invention is unfolded into a planer regular 2N-sided polygonal shape defined with 2N (N being an integer equal to or larger than 3) rods. Thus, the supporting plate can be securely and rigidly supported with the rods defining the sides of the regular 2N-sided polygonal shape. The frame structure according to the present invention can be folded into a columnar shape as a whole from the unfolded state with the rods folded toward an inner side of the regular 2N-sided polygonal shape about the diagonal axis by means of the second coupling means and about the orthogonal axis to approach each other by means of the second coupling means while being rotated about the axis by means of the rotation unit, and thus can be stored in a compact manner.

In the present invention, the flexible sheet having substantially the same shape as the 2N-sided polygonal shape or the regular 2N-sided polygonal shape is provided and has sides suspended across the rods. Thus, no supporting plate needs to be prepared on the 2N-sided polygonal shape or the regular 2N-sided polygonal shape in the unfolded state, whereby higher usability can be achieved.

In the present invention, the rotation of the rod about the orthogonal axis can be locked with the first coupling unit. Thus, the posture of the structure in each of the unfolded state and the folded state can be maintained, whereby the structure can be more securely supported in the unfolded state and can be more easily carried in the folded state.

The structure according to the present invention includes a plurality of the first or second frame structures according to the present invention arranged at intervals in a direction orthogonal to a plane including the 2N-sided polygonal shape, and a plurality of struts coupling and fixing apices of the 2N-sided polygonal shapes of two adjacent ones of the frame structures to each other. Thus, a plurality of supporting plates, sheets, or the like securely and rigidly supported can be provided in the direction orthogonal to the plane. Thus, the structure according to the present invention can be used for various applications such as a tent. For example, the number of frame structures may be changed in accordance with the number of users, whereby higher usability can be achieved. The structure according to the present invention may have the struts detached from the frame structures, so that each of the frame structure as a whole can be folded into a columnar shape, whereby the structure as a whole can be in the compact storage state to be easily carried around.

DESCRIPTION OF THE EMBODIMENTS

Figure 1:
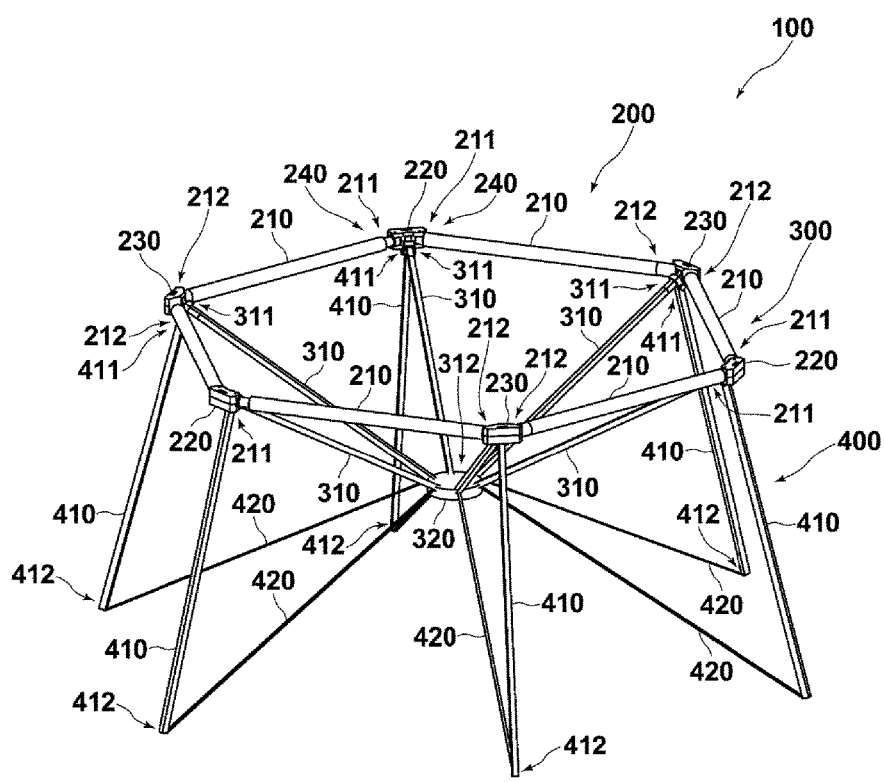
FIG. 1 is a perspective view of a frame structure according to a first embodiment of the present invention as viewed from a front upper left side.
Figure 2:
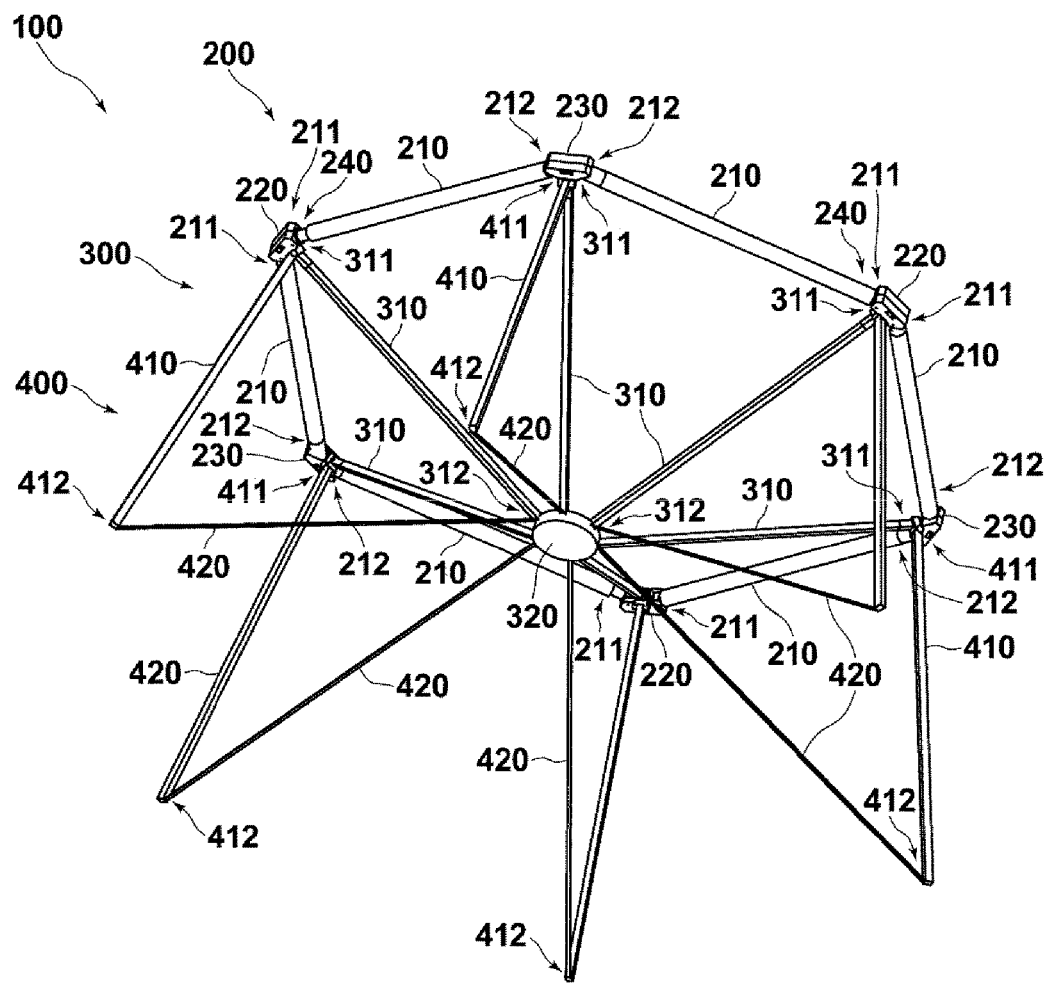
FIG. 2 is a perspective view of the frame structure according to the first embodiment of the present invention as viewed from a front lower right side.
Figure 3:
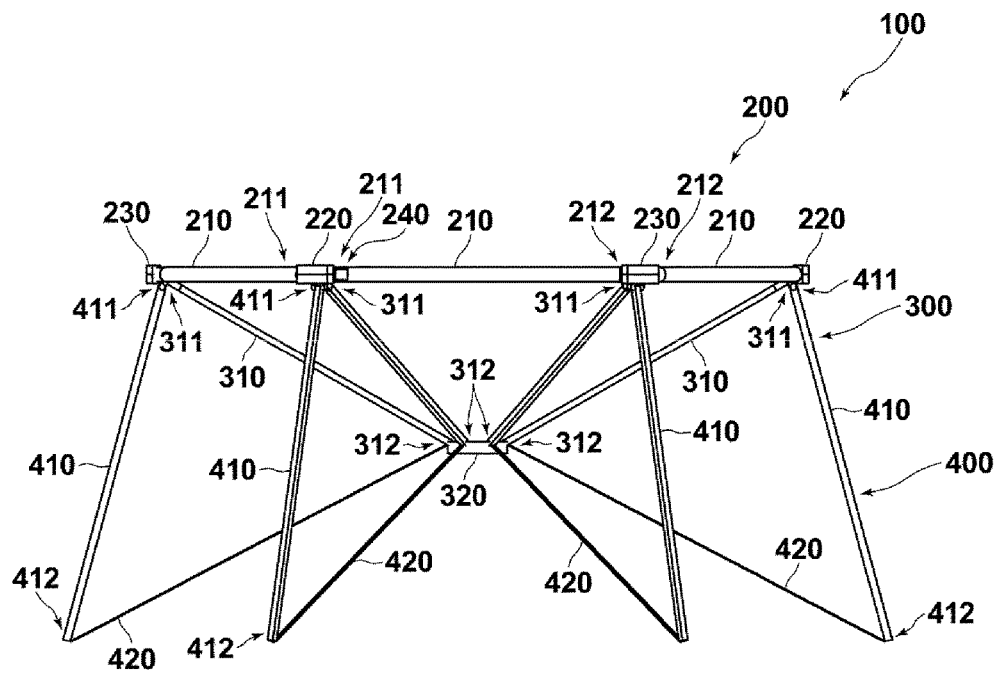
FIG. 3 is a front view of the frame structure according to the first embodiment of the present invention.
Figure 4:
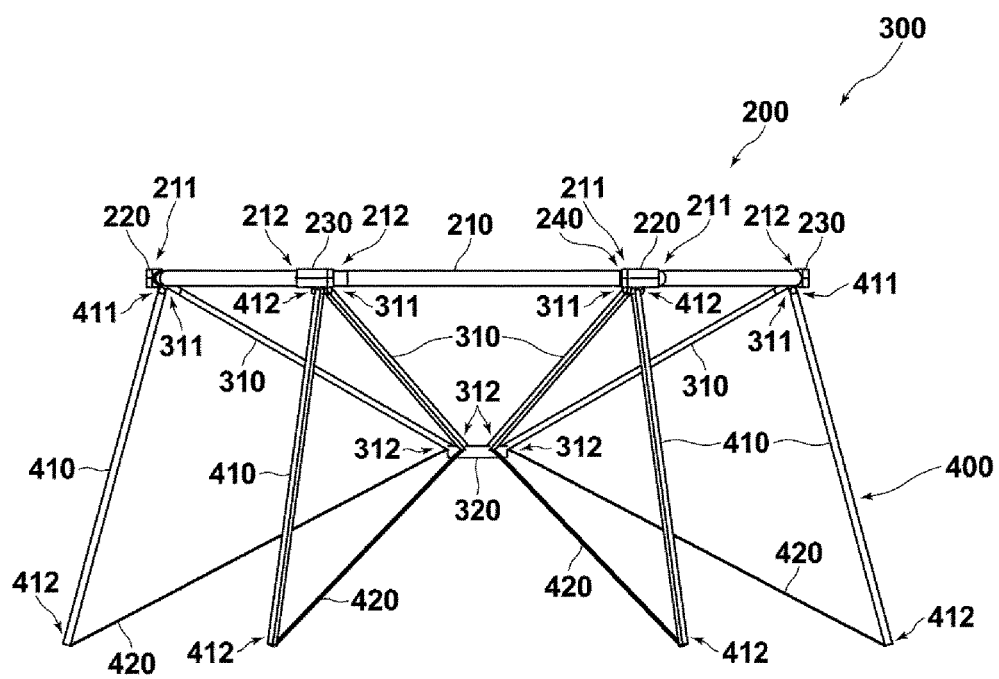
FIG. 4 is a back view of the frame structure according to the first embodiment of the present invention.
Figure 5:
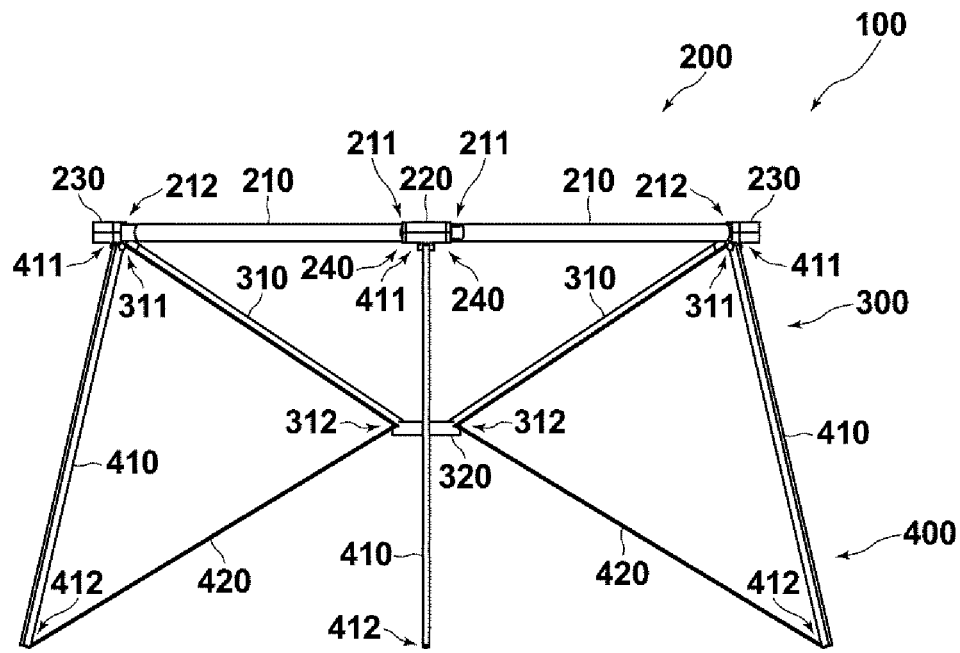
FIG. 5 is a right-side view of the frame structure according to the first embodiment of the present invention.
Figure 6:
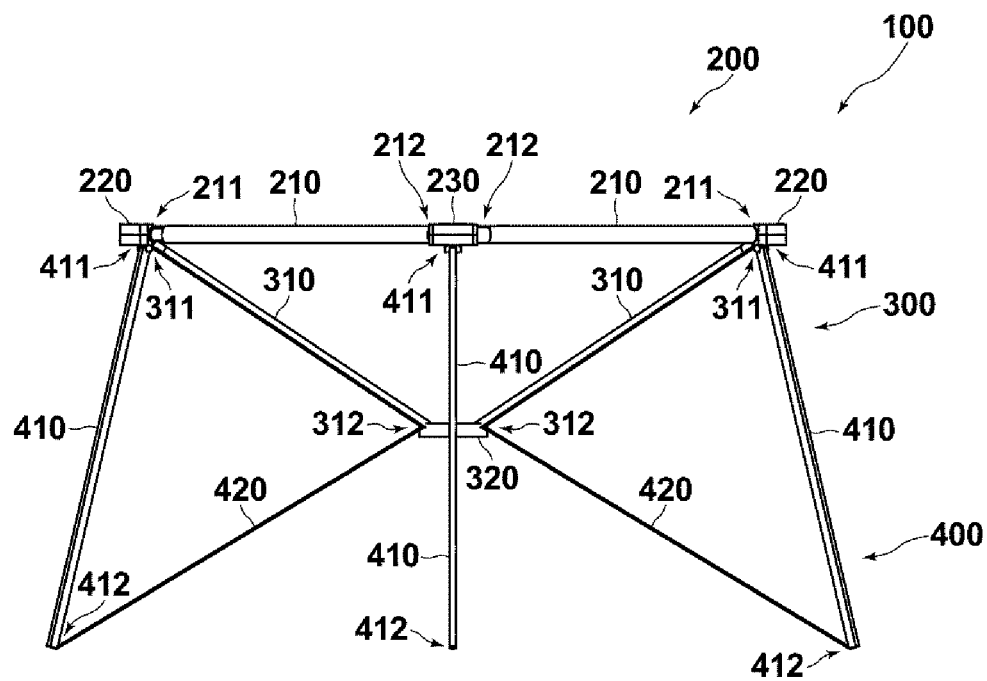
FIG. 6 is a left-side view of the frame structure according to the first embodiment of the present invention.
Figure 7:
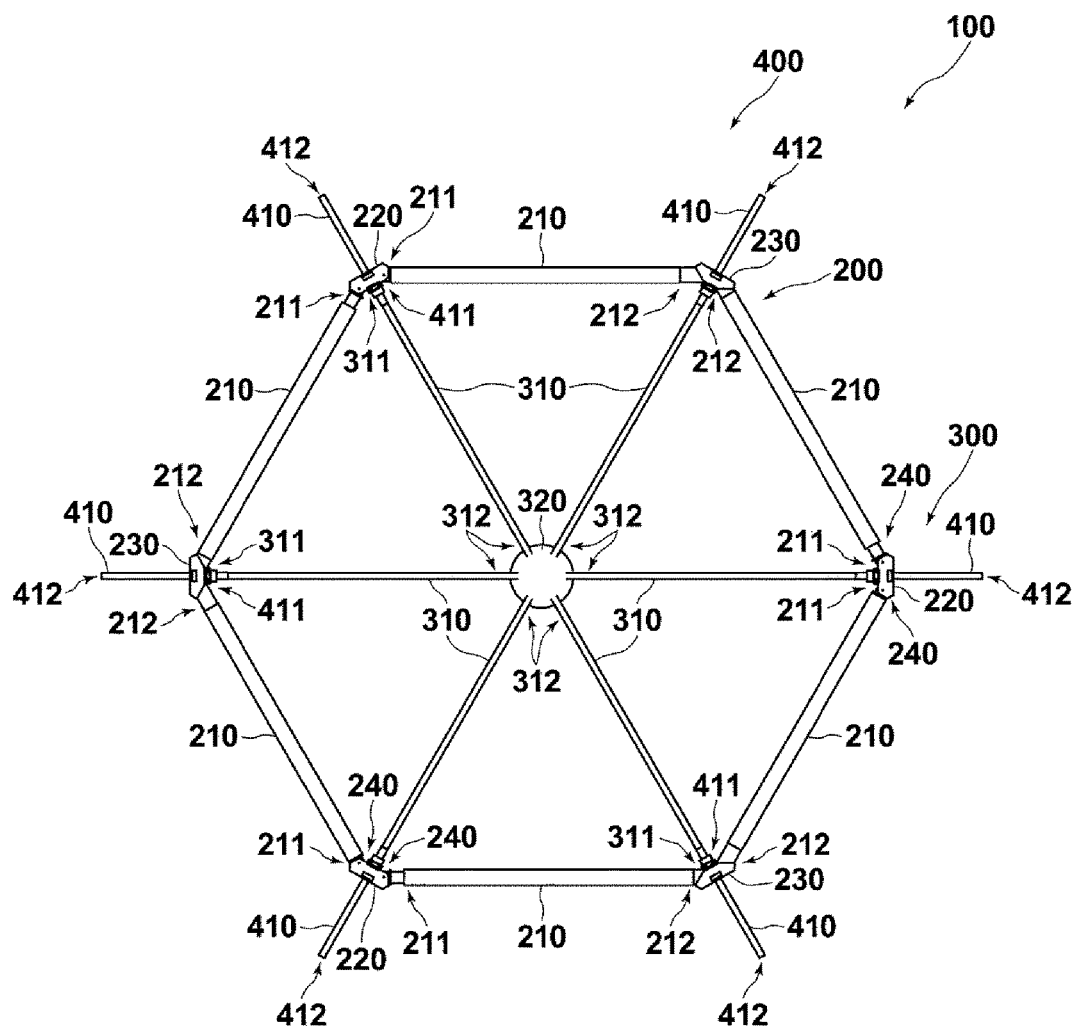
FIG. 7 is a plan view of the frame structure according to the first embodiment of the present invention.
Figure 8:
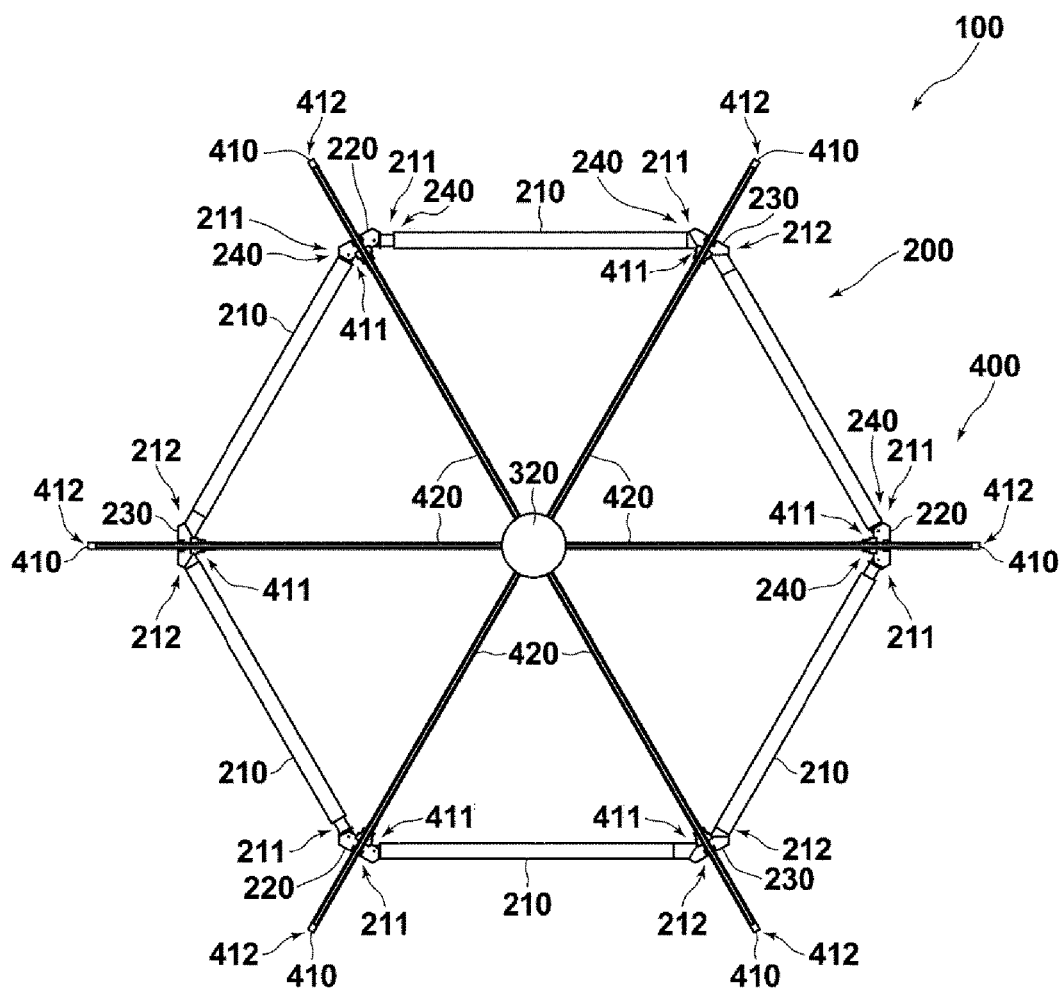
FIG. 8 is a bottom view of the frame structure according to the first embodiment of the present invention.

A first embodiment according to the present invention is described in detail below with reference to the drawings. A frame structure 100 according to one embodiment of the present invention is described. FIG. 1 is a perspective view of the frame structure 100 as viewed from a front upper left side. FIG. 2 is a perspective view of the frame structure 100 as viewed from a front lower right side. FIG. 3 is a front view of the frame structure 100. FIG. 4 is a back view of the frame structure 100. FIG. 5 is a right-side view of the frame structure 100. FIG. 6 is a left-side view of the frame structure 100. FIG. 7 is a plan view of the frame structure 100. FIG. 8 is a bottom view of the frame structure 100.

The frame structure 100 includes an upper structure 200, an intermediate structure 300, and a lower structure 400. A structure, an architecture, a person, an animal, an item, and the like can be placed on the upper structure 200. The intermediate structure 300 is provided on the lower side of the upper structure 200 and supports the upper structure 200. The lower structure 400 is coupled to the intermediate structure 300 and is disposed on the ground.

Figure 9:
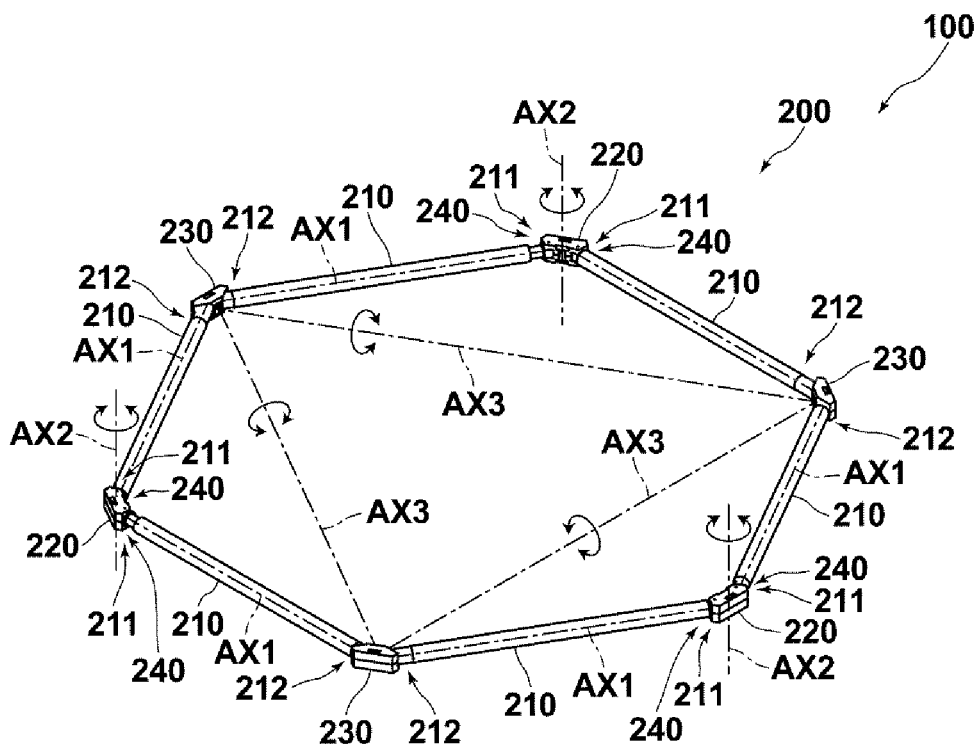
FIG. 9 is a perspective view of the frame structure consisting of an upper structure as viewed from a front upper right side.
Figure 10:
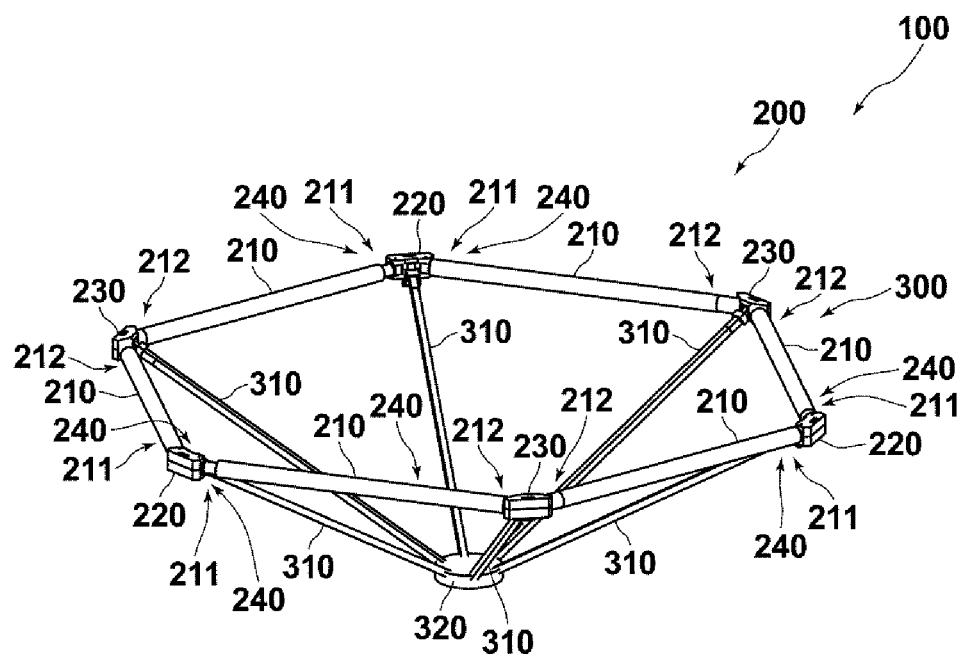
FIG. 10 is a perspective view of the frame structure consisting of the upper structure and an intermediate structure as viewed from the front upper right side.

As illustrated in FIG. 9, the frame structure 100 may have the upper structure 200 directly installed on the ground, so that the upper structure 200 solely serves as the frame structure. Alternatively, the frame structure 100 may have the upper structure 200 and the intermediate structure 300 serving as a frame structure used outside of the earth's atmosphere or in a space for containing liquid such as water, oil, or the like as illustrated in FIG. 10.

Figure 11:
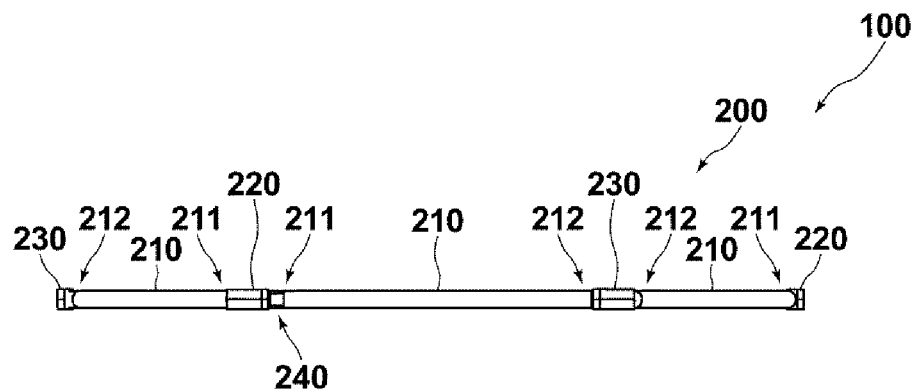
FIG. 11 is a front view of the upper structure of the frame structure according to the first embodiment of the present invention.
Figure 12:
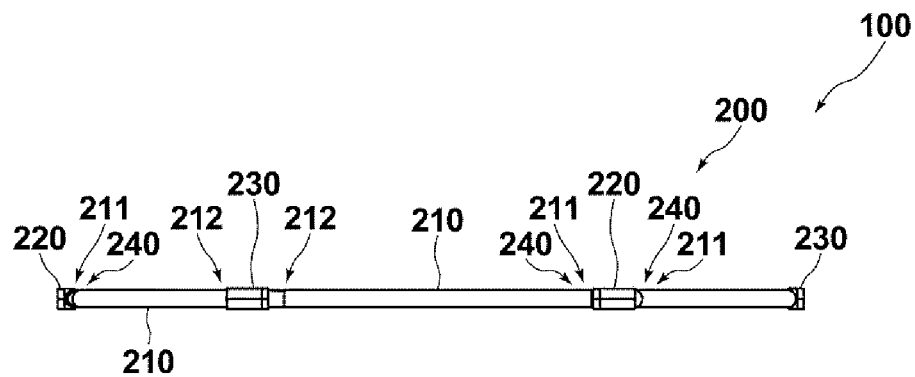
FIG. 12 is a back view of the upper structure of the frame structure according to the first embodiment of the present invention.
Figure 13:
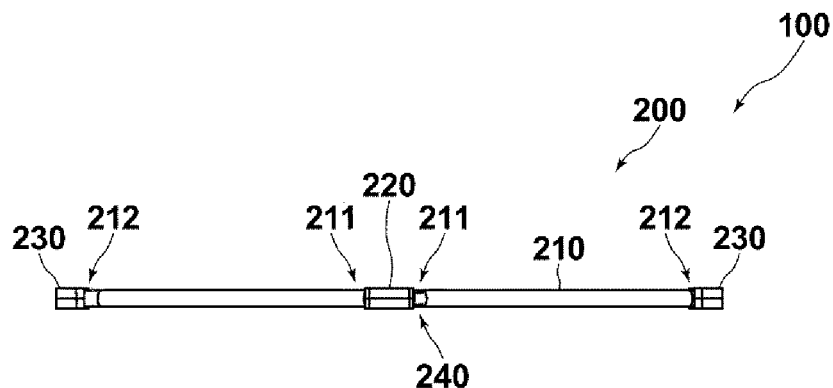
FIG. 13 is a right-side view of the upper structure of the frame structure according to the first embodiment of the present invention.
Figure 14:
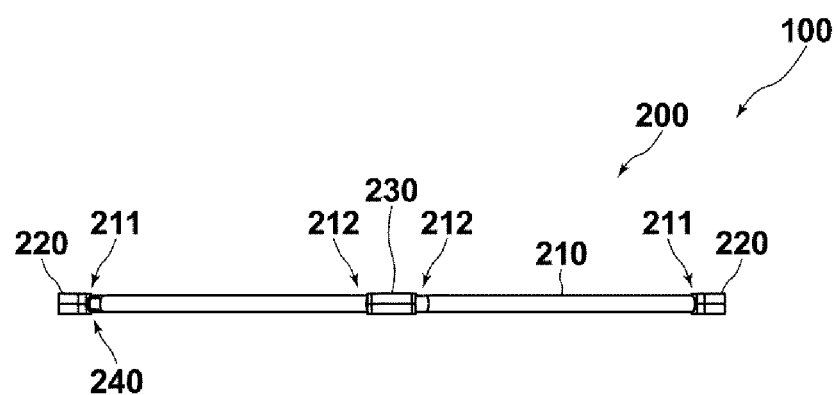
FIG. 14 is a left-side view of the upper structure of the frame structure according to the first embodiment of the present invention.
Figure 15:
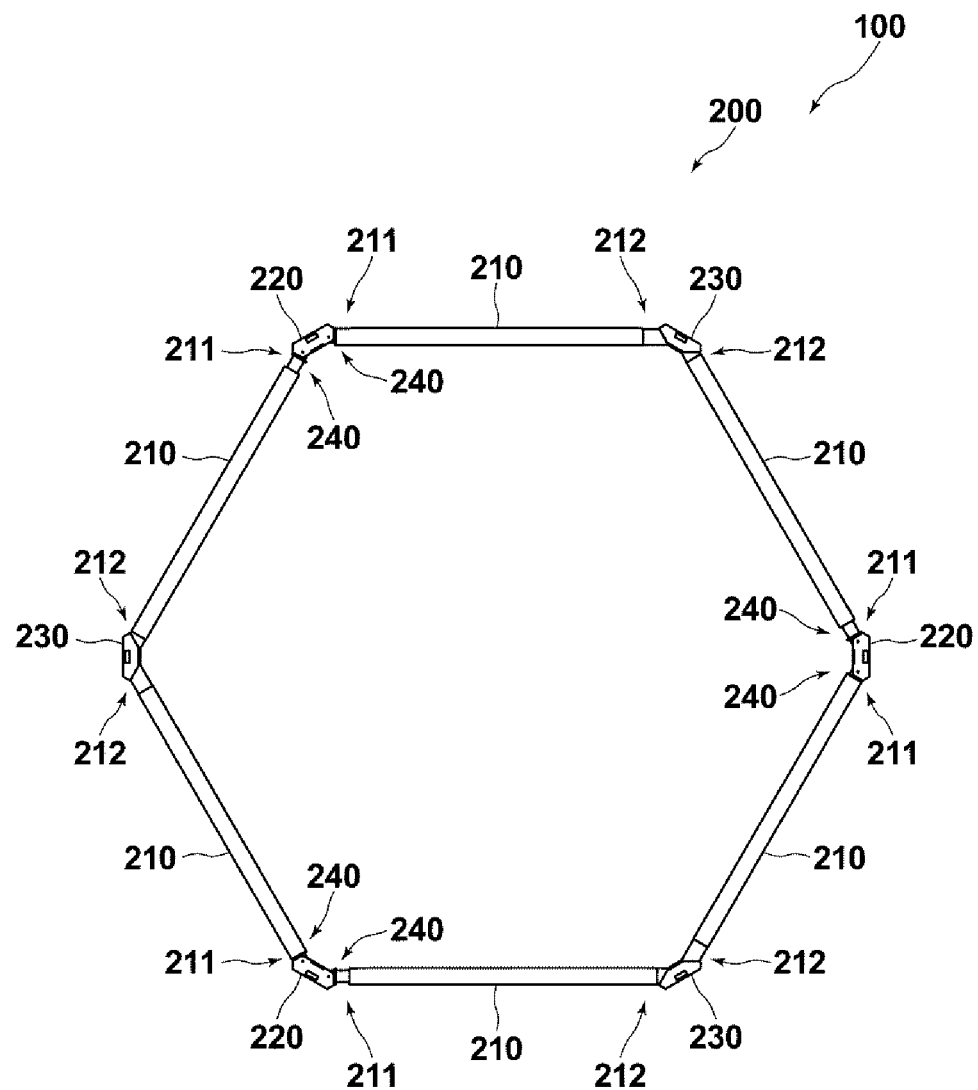
FIG. 15 is a plan view of the upper structure of the frame structure according to the first embodiment of the present invention.
Figure 16:
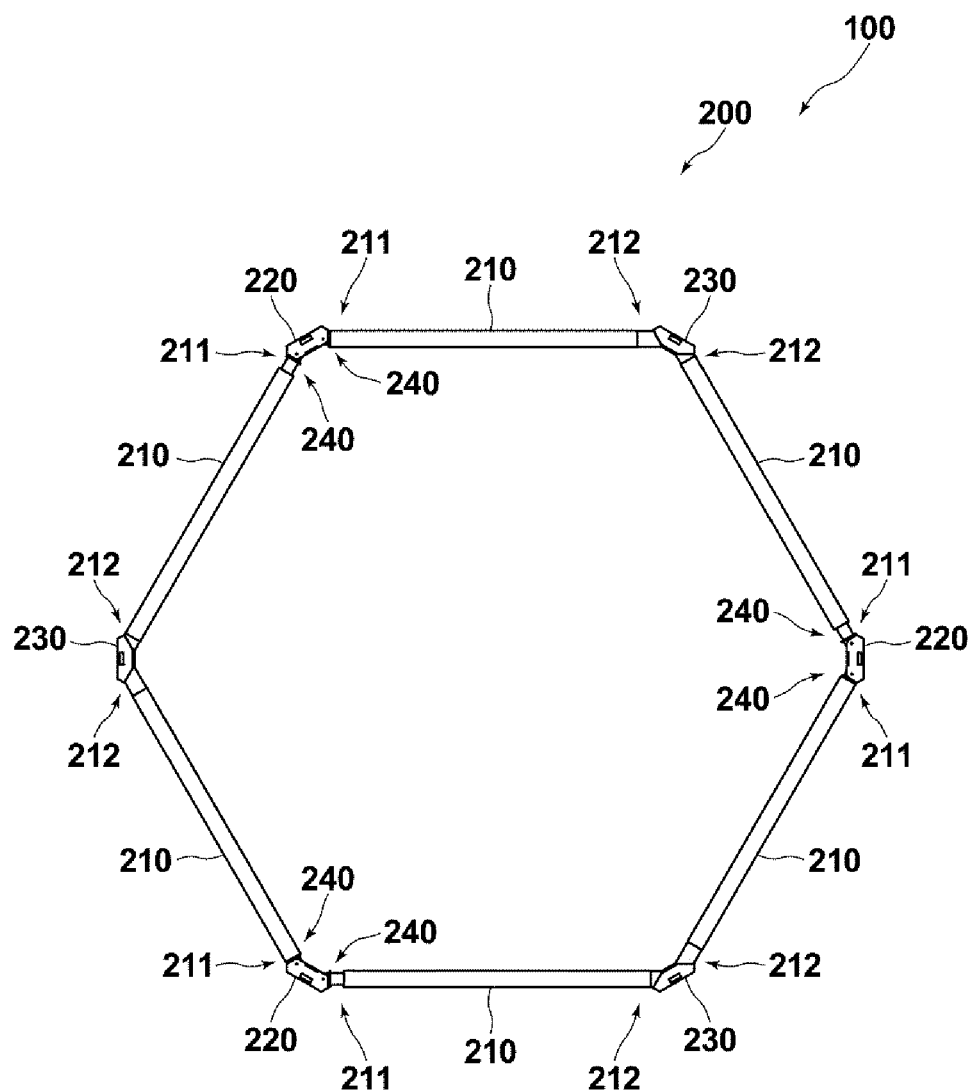
FIG. 16 is a bottom view of the upper structure of the frame structure according to the first embodiment of the present invention.

FIG. 9 is a perspective view of upper structure 200 as viewed from a front upper right side. FIG. 10 is a perspective view of the upper structure 200 and the intermediate structure 300 as viewed from the front upper right side. FIG. 11 is a front view of the upper structure 200. FIG. 12 is a back view of the upper structure 200. FIG. 13 is a right-side view of the upper structure 200. FIG. 14 is a left-side view of the upper structure 200. FIG. 15 is a plan view of the upper structure 200. FIG. 16 is a bottom view of the upper structure 200.

The upper structure 200 is described by mainly referring to FIG. 9. The upper structure 200 includes six upper rods 210, three first coupling means 220 that are coupled to and hold first end portions 211 of the upper rods 210, three second coupling means 230 that are coupled to and hold second end portions 212 of the upper rod 210, and six rotation means 240 that enable the upper rods 210 to rotate about a first axis AX1.

The first axis AX1 is a center axis of the upper rod 210 extending in a longitudinal direction and passing through the center of the upper rod 210. The upper rods 210 are elongated column members having substantially the same length. The length and the thickness of the upper rod 210 are changed in accordance to an application, such as a space structure, recreational equipment, and a furniture, and thus are not particularly limited.

The upper rod 210 has a circular cross-sectional shape in a direction orthogonal to the first axis AX1. The cross-sectional shape of the upper rod 210 is not limited, and may be an elliptical shape, a rectangular shape, or the like for example. The upper rod 210 may be a solid member or a hollow member such as a pipe for example. The material of the upper rod 210 is not limited as long as the material has rigidity. For example, a material such as metal, wood, and resin may be used.

Each of the first coupling means 220 is provided at a corresponding one of apices of a regular hexagonal shape. The first coupling unit 220 is coupled to and holds the first end portion 211 in such a manner that the upper rod 210 as the target of coupling and holding can rotate about an orthogonal axis AX2. The orthogonal axis AX2 is an axis orthogonal to the first axes AX1 of both upper rods 210 as the target of coupling and holding.

The second coupling means 230 are provided to the apices in an alternating pattern to be provided to apices without the first coupling means 220. The second coupling unit 230 is coupled to and holds the second end portion 212 in such a manner that the upper rod 210 as the target of coupling and holding can rotate about the diagonal axis AX3. The diagonal axis AX3 extends in a diagonal direction inclined by 30° relative to each of the first axes AX1 of the upper rods 210 as the targets of coupling and holding.

The rotation unit 240 enables the upper rod 210 to rotate about the first axis AX1 at a portion close to the first end portion 211.

Figure 17:
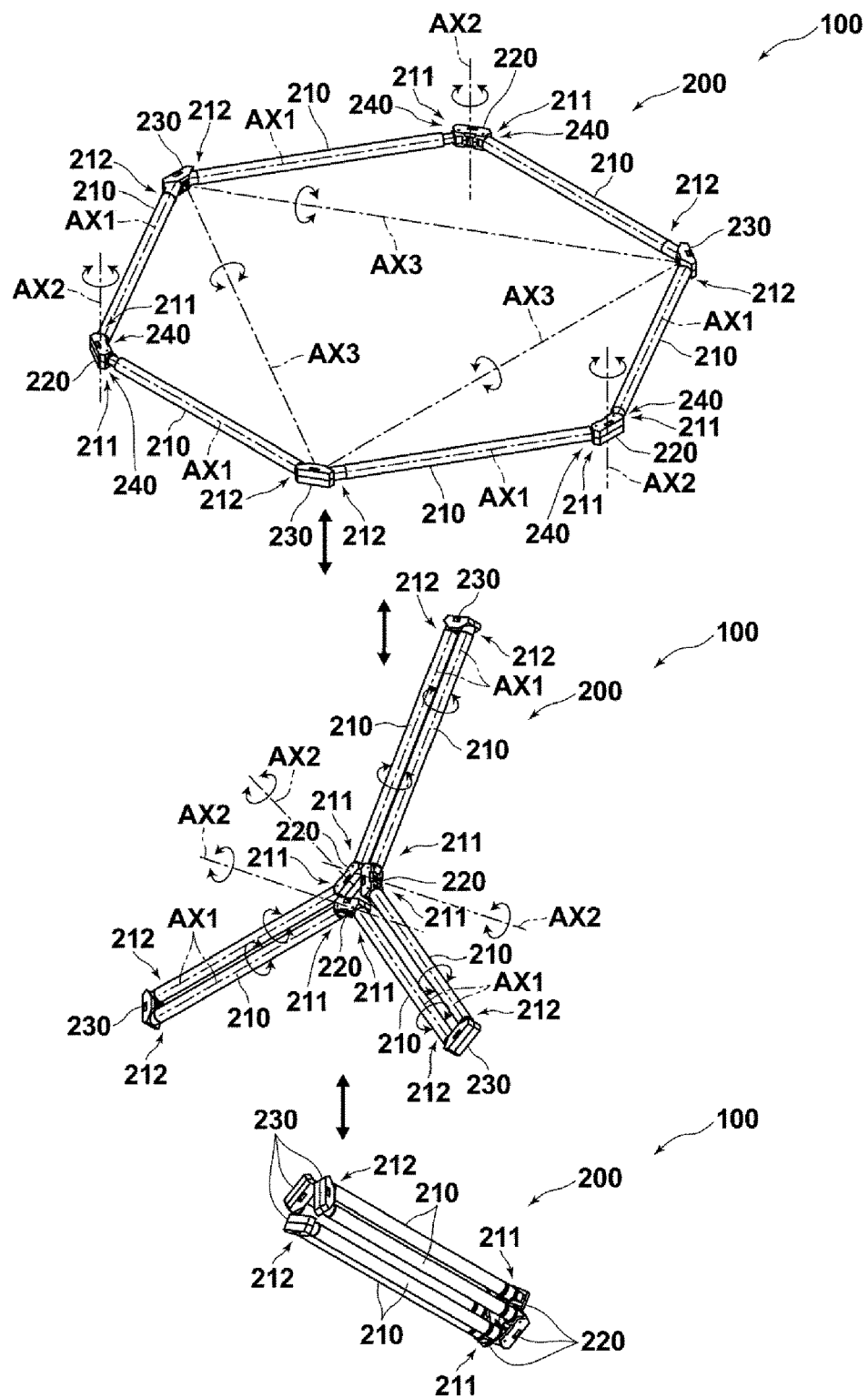
FIG. 17 is a diagram illustrating unfolded and folded states of the frame structure consisting of the upper structure.

The upper rods 210 of the upper structure 200 in an unfolded state, as illustrated in FIG. 17, are rotated about the diagonal axes AX3 by means of the second coupling unit 230, to be folded toward the inner side of the regular hexagonal shape.

Then, the upper rods 210 are rotated about the orthogonal axes AX2 by means of the first coupling means 220 to approach each other while rotating about the first axes AX1 by means of the rotation unit 240. Thus, the upper structure 200 is folded into a single column member.

The upper rod 210 may be folded toward the inner side of the regular hexagonal shape, and at the same time, folded to approach each other while rotating about the first axes AX1. The upper structure 200 has no mechanism for rotating about any axis other than the first axis AX1, the orthogonal axis AX2, and the diagonal axis AX3. Thus, transition into a shape other than the regular hexagonal unfolded shape, a folded shape (single column member), and an intermediate shape between these states is restricted.

The unfolded shape of the upper structure 200 of the frame structure 100 according to the first embodiment is not limited to the regular hexagonal shape. Thus, the unfolded shape of the upper structure 200 may be any regular 2N-sided polygonal shape (N being an integer equal to or larger than 3), examples of which include a regular octagonal shape and a regular dodecagonal shape.

The regular 2N-sided polygonal unfolded shape (N being an integer equal to or larger than 3) can be achieved with the upper structure 200 according to the first embodiment including 2N upper rods, N first coupling means 220, N second coupling means 230, and 2N rotation means 240.

Figure 18:
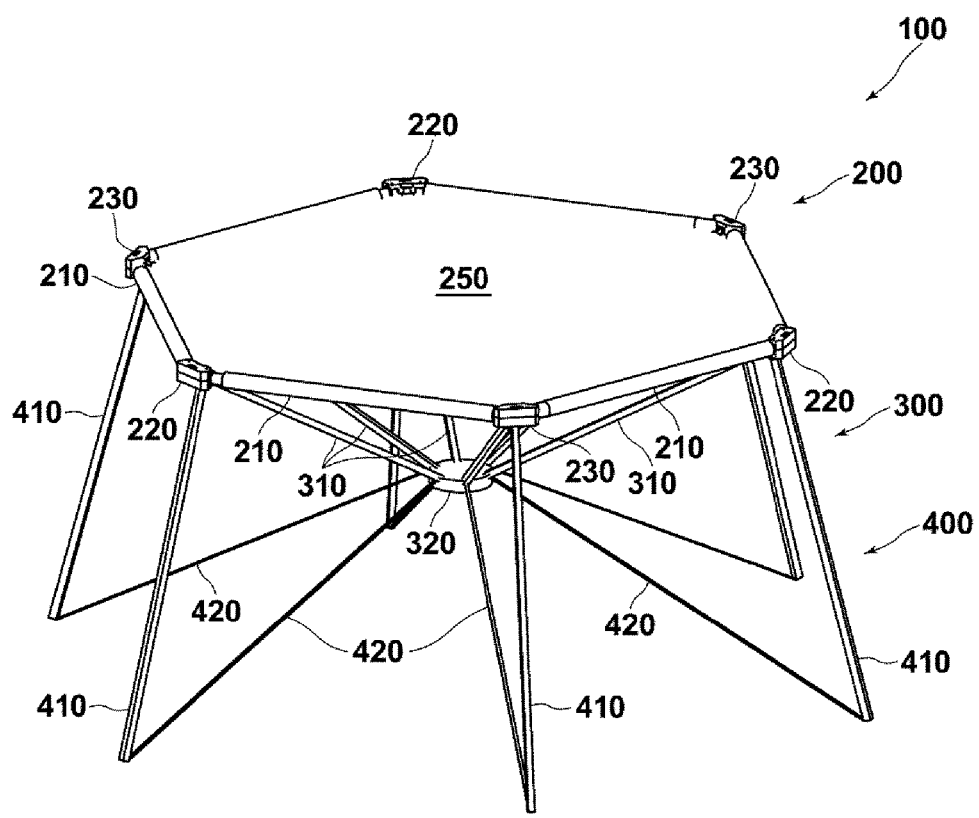
FIG. 18 is a perspective view of the frame structure including a flexible sheet.

As illustrated in FIG. 18, the frame structure 100 may include a flexible sheet 250, having substantially the same shape as the regular hexagonal shape, to cover the upper structure 200. The material of the sheet 250 is not limited as long as the sheet can have flexibility, and thus may be cloth or resin such as nylon or vinyl. The sheet 250 may have a meshed structure.

The sheet 250 is attached to the upper rods 210 to cover the inner side of the regular hexagonal shape in the unfolded state. The sheet 250 has sides each fixed to a corresponding one of the upper rods 210 to match a corresponding side of the regular hexagonal shape, using a known method employing a rope, a string material, a hook-and-loop fastener, or the like.

The sheet may be designed to have the regular 2N-sided polygonal shape (N being an integer equal to or larger than 3) when the upper structure 200 has the regular 2N-sided polygonal unfolded shape (N being an integer equal to or larger than 3). The upper structure 200 to support a heavy member or the like may include, instead of the sheet 250, a planar plate serving as a supporting plate that has high rigidity and is made of metal, wood, or the like.

The upper rod 210 is preferably extendable and contractible in the first axis direction AX1. A risk of each rotation being hindered by the tension of the sheet 250 can be reduced with the upper rod 210 contracting in the first axis direction AX1 while the unfolding or folding is in process. The sheet 250 can receive sufficient tension with the upper rod 210 extended in the first axis direction AX1 after the structure is unfolded. Specifically, the upper rod 210 is preferably extendable and contractible by about 3 to 10% of the maximum entire length in the first axis direction AX1.

Referring back to FIG. 1 to FIG. 8, the intermediate structure 300 will be described. The intermediate structure 300 includes six intermediate rods 310 and a third coupling unit 320. The intermediate rods 310 each has a first end portion 311 coupled to and rotatably held by the first coupling unit 220 and the second coupling unit 230, and has second end portions 312 converge at, coupled to, and rotatably held by the third coupling unit 320.

The intermediate structure 300 may not include the third coupling unit 320, and the second end portions 312 may be directly coupled to and rotatably hold each other. The intermediate structure may include 2N intermediate rods 310 and a single third coupling unit 320, when the upper structure has the regular 2N-sided polygonal unfolded shape (N being an integer equal to or larger than 3). The intermediate rod 310 may only include N rods coupled with the first coupling means 220 or with the second coupling means 230.

The intermediate rod 310 is an elongated columnar member. The intermediate rods 310 have substantially the same length. The length of the intermediate rod 310 is not particularly limited, as in the case of the upper rod 210. The intermediate rod 310 has a circular cross-sectional shape in a direction orthogonal to the axis of the intermediate rod 310. The axis of the intermediate rod 310 is a center axis extending in the longitudinal direction of the intermediate rod 310.

The cross-sectional shape of the intermediate rod 310 is not particularly limited, and may be an elliptical shape or a rectangular shape, as in the case of the upper rod 210. The intermediate rod 310 may be a solid member or a hollow member such as a pipe for example. The material of the intermediate rod 310 is not limited as long as the material has rigidity. For example, a material such as metal, wood, and resin may be used.

The intermediate rod 310 is preferably longer than the upper rod 210 so that the third coupling unit 320 is positioned on the normal line passing through the center of the regular hexagonal shape. The frame structure 100 can have six truss structures, consist of the upper rods 210 and the intermediate rods 310, on the lower side of the regular hexagonal shape in the unfolded state. The frame structure has 2N (N being an integer equal to or larger than 3) truss structure to have higher rigidity, when the upper structure has the regular 2N-sided polygonal unfolded shape (N being an integer equal to or larger than 3).

The first end portions 311 of three of the six intermediate rod 310 are detachably coupled to and held by the first coupling means 220. The first end portions 311 of the remaining three intermediate rods 310 are detachably coupled with and held by the second coupling means 230. The second end portions 312 are coupled to and held by the third coupling unit 320 while being radially arranged at an equal angle.

The first end portions 311 are rotatable about a rotational axis orthogonal to the axes of the intermediate rods 310, at the first coupling means 220 and the second coupling means 230. The second end portions 312 are rotatable about the rotational axis orthogonal to the axes of the intermediate rods 310, at the third coupling unit 320.

The first end portions 311 of the intermediate structure 300 are detached from the first coupling means 220, and then the upper structure 200 is folded. As a result, the intermediate rods 310 coupled to the second coupling means 230 follow the folding to be folded toward the inner side of the regular hexagonal shape to approach each other.

When the intermediate rods 310 are detached from the first coupling means 220 and then folded toward the inner side of the regular hexagonal shape to approach each other, the intermediate structure 300 can be folded together with the upper structure 200 to be in a single column state.

The lower structure 400 is described. The lower structure 400 includes six lower rods 410 and string materials 420 joining the lower rods 410 with the third coupling unit 320.

The lower rods 410 have first end portions 411 rotatably coupled with the intermediate rods 310, and have second end portions 412 joined to the string materials 420 and installed on the ground.

The number of the lower rods 410, which is not particularly limited, is preferably three or more so that the frame structure 100 can be securely installed. The lower rods 410 preferably extend diagonally downward toward the ground while being arranged at an equal interval. The string material 420 is not limited as long as the material has rigidity, and may be a wire, a rope, or the like for example. The lower rod 410 is adjustable to be extendable and contractible. Thus, the frame structure 100 can be securely installed even on a largely uneven ground.

During the folding, the lower rods 410 are folded to approach the intermediate rods 310. As a result, the string materials 420 are slacked. Thus, the lower structure 400 can be folded together with the upper structure 200 and the intermediate structure 300 to be in the single column state.

Figure 19A:
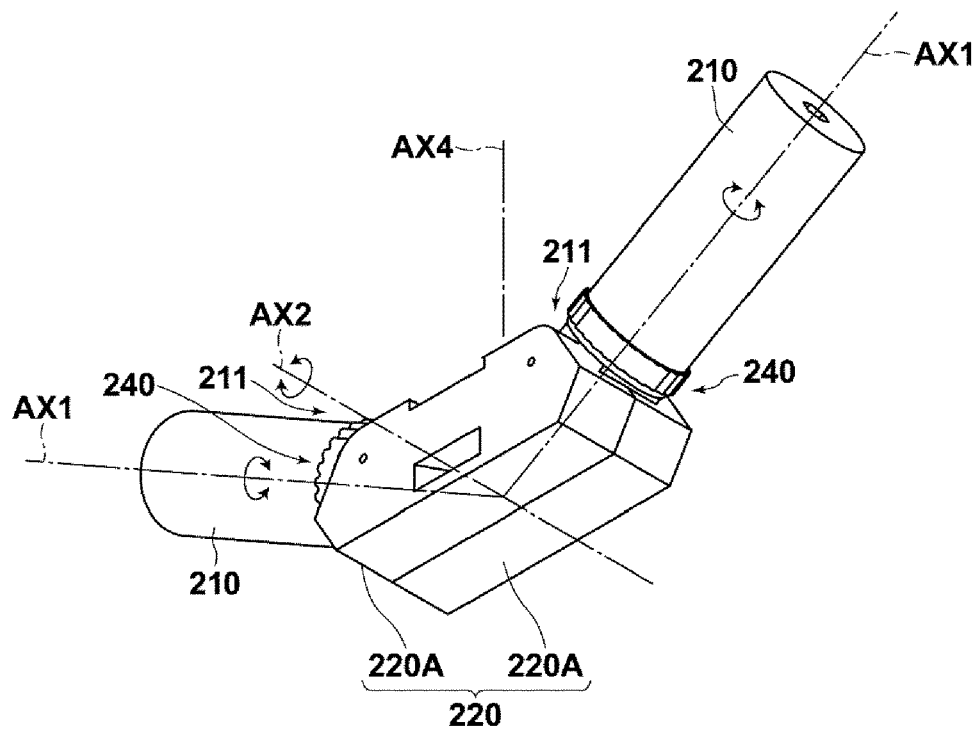
FIG. 19A is an enlarged perspective view of a portion around a first coupling unit.

A configuration of coupling the first end portion 211 and the second end portion 312 to each other by means of the first coupling unit 220 is described. FIG. 19A is an enlarged perspective view of a portion around the first coupling unit 220 of the frame structure 100.

Figure 19B:
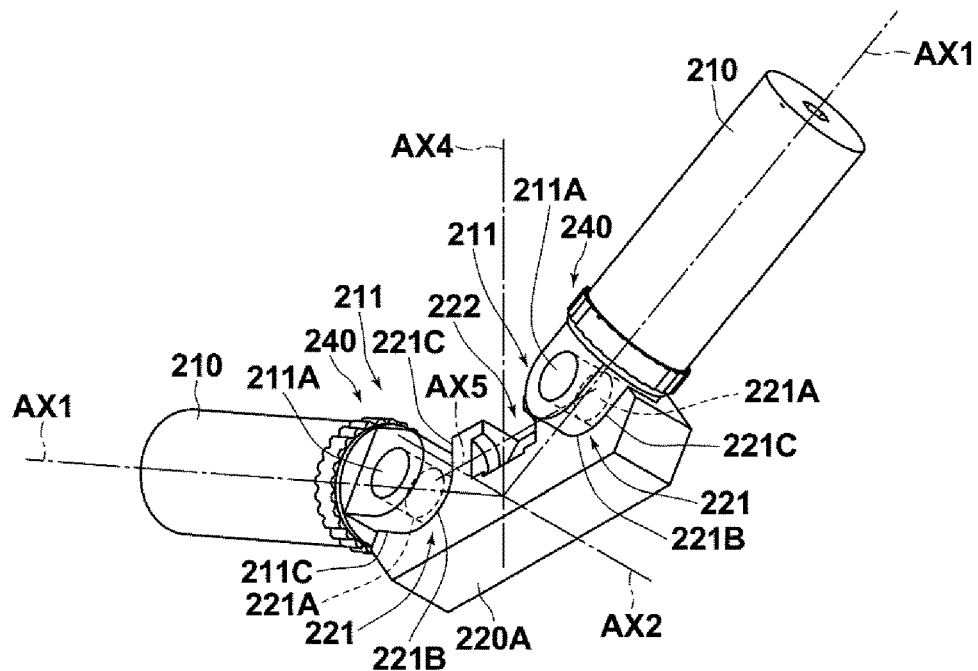
FIG. 19B is an exploded perspective view of the first coupling unit illustrating only one of first main bodies.

The first coupling unit 220 is a structure obtained with two first main bodies 220A that are the same parts combined with each other using a known method such as a screw. FIG. 19B is an exploded perspective view of illustrating only one of the first main bodies 220A.

The first main body 220A has first notches 221, for receiving the first end portions 211, on both left and right sides. The first notch 221 has a bottom surface provided with a cylindrical protrusion 221A protruding in the direction along the orthogonal axis AX2.

The first end portion 211 has a distal end having a semicircular shape. A through hole 211A having the same diameter as the protrusion 221A is formed at the center of the semicircle. The first notch 221 further includes a curved surface 221B having a curvature of radius that is equivalent to the diameter of the distal end of the first end portion 211 and a flat surface 221C that continues from both sides of the curved surface 221B.

The first end portion 211 has the protrusion 221A fit in the through hole 211A to be rotatable relative to the first coupling unit 220. A clearance, large enough to enable the first end portion 211 to slide, is provided between the protrusion 221A and the through hole 211A and between the curved surface 221B and the first end portion 211.

The first end portion 211 comes into contact with the flat surface 221C so that a rotational angle is limited in the folded state. The first end portion 211 comes into contact with the flat surface 221C on the outer side so that the rotational angle is limited in the unfolded state. A rotational angle of the first end portion 211 about the orthogonal axis AX2 is limited.

The flat surfaces 221C are formed to have the first axes AX1 in parallel with each other in the folded state. The flat surfaces 221C are formed to have the first axes AX1 inclined relative to each other by an angle of 120° in the unfolded state. The flat surfaces 221C may be formed to have the first axes AX1 inclined relative to each other by an angle of (180-360/2N)° in the unfolded state, when the upper structure has the regular 2N-sided polygonal unfolded shape (N being an integer equal to or larger than 3).

The first coupling unit 220 may include a first lock mechanism that locks the rotation of the first end portion 211 about the orthogonal axis AX2. The first lock mechanism may have a known configuration such as a configuration in which the first main body 220A and the first end portion 211 are joined together with a pin or the like.

In FIG. 19A and FIG. 19B, the first end portion 311 of the intermediate rod 310 is omitted. In FIG. 19A and FIG. 19B, only the second axis AX4 is illustrated as an element related to the first end portion 311. The second axis AX4 is a center axis extending in the longitudinal direction of the intermediate rod 310.

The first main body 220A includes a first intermediate notch 222, for receiving the unillustrated first end portion 311, between the left and the right first notches 221. The unillustrated first end portion 311 has a stepped cylindrical shape orthogonal to the second axis AX4.

The first intermediate notch 222 has an inner circumference surface with a curvature of radius that is equivalent to the diameter of the unillustrated first end portion 311. The unillustrated first end portion 311 can slide in the first intermediate notch 222. Thus, the unillustrated first end portion 311 can rotate about a rotational axis AX5, relative to the first coupling unit 220. The rotational axis AX5 is orthogonal to the second axis AX4.

In the first embodiment, a hole structure is formed on the side of the first end portion 211, and a protrusion structure is formed on the side of the first main body 220A. Alternatively, the first end portion 211 may be the protrusion structure and the first main body 220A may be the hole structure. Similarly, the hole structure on the side of the first main body 220A and the protrusion structure on the side of the first end portion 311, may be respectively on the side of the first end portion 311 and the side of the first main body 220A.

In the first embodiment, the rotation unit 240 is a mechanism that enables the first end portion 211 rotate about the first axis AX1, relative to the main body of the upper rod 210. The rotation unit 240 may be a known mechanism consisting of: a protrusion or a recess in the direction along the first axis AX1 provided on the side of the first end portion 211; and a recess or a protrusion in the direction along the first axis AX1 provided on the side of the main body. The rotation unit 240 may have the first main body 220A divided so that a portion including the first notch 221 can rotate about the first axis AX1.

Figure 20A:
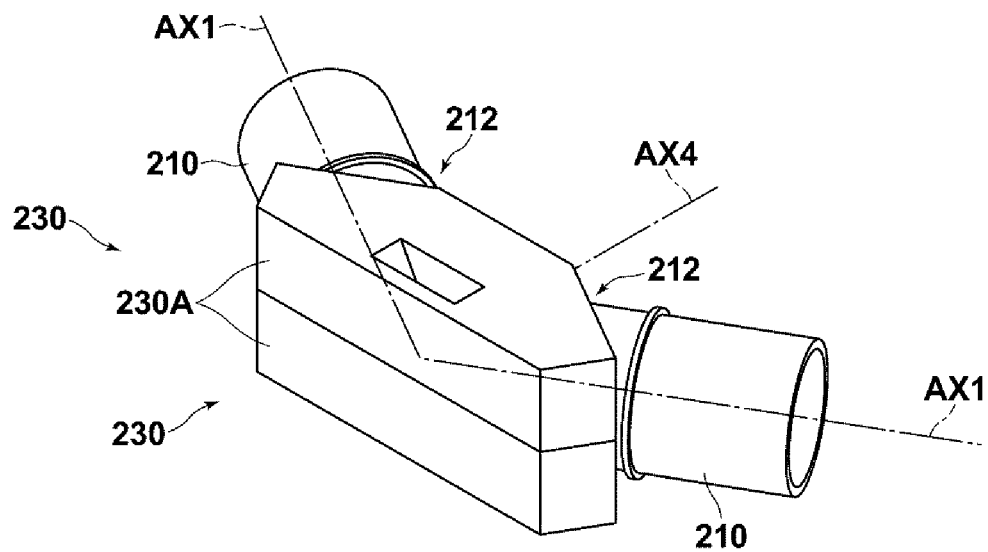
FIG. 20A is an enlarged perspective view of a portion around a second coupling unit.

A configuration of coupling the second end portion 212 and the first end portion 311 to each other by means of the second coupling unit 230 is described. FIG. 20A is an enlarged perspective view of a portion around the second coupling unit 230 of the frame structure 100.

The second coupling unit 230 is a structure obtained with two second main bodies 230A that are the same parts combined with each other using a known method such as a screw. FIG. 20A is an exploded perspective view illustrating only one of the second main bodies 230A.

The second main body 230A has second notches 231, for receiving the second end portions 212, on both left and right sides. The second end portion 212 has a stepped cylindrical shape that is inclined relative to the first axis AX1 by an angle of 30°. The second notch 231 is formed in the direction along the diagonal axis AX3 to be also inclined by an angle of 30° relative to the first axis AX1, in the unfolded state.

The second coupling unit 230 enables the second end portion 212 to rotate by 180° about the diagonal axis AX3 from the unfolded state until the upper rod 210 is positioned on the inner side of the regular hexagonal shape. The second end portion 212 preferably has the rotation about the diagonal axis AX3 restricted, upon reaching the unfolded position and a position as a result of rotation by 180°. The second end portion 212 may have an outer circumference surface provided with a protrusion. Thus, the rotational angle about the diagonal axis AX3 may be restricted with the protrusion coming into contact with the second main body 230A, upon reaching the unfolded position and the position as a result of rotation by 180°.

The unfolded and the folded shapes of the upper structure 200 can be accurately achieved with at least one of the first coupling unit 220 and the second coupling unit 230 having the rotational angle of the first end portion 211 about the orthogonal axis AX2 and/or the rotational angle of the second end portion 212 about the diagonal axis AX3 limited at the unfolded position and the folded position.

The second end portion 212 may be inclined by an angle of $(180/2N)°$ relative to the first axis AX1, when the upper structure has the regular 2N-sided polygonal unfolded shape (N being an integer equal to or larger than 3). The second notch 231 may also be formed in the direction along the diagonal axis AX3 that is inclined by an angle of $(180/2N)°$ relative to the first axis AX1.

The second notch 231 has an inner circumference surface having a radius of curvature that is substantially equivalent to the diameter of the second end portion 212. A clearance, large enough to enable the second end portion 212 to slide, is provided between the second notch 231 and the second end portion 212.

The second coupling unit 230 may include a second lock mechanism that locks the rotation of the second end portion 212 about the diagonal axis AX3. The second lock mechanism may have a known configuration such as a configuration in which the second main body 230A and the second end portion 212 are joined together with a pin or the like.

Figure 20B:
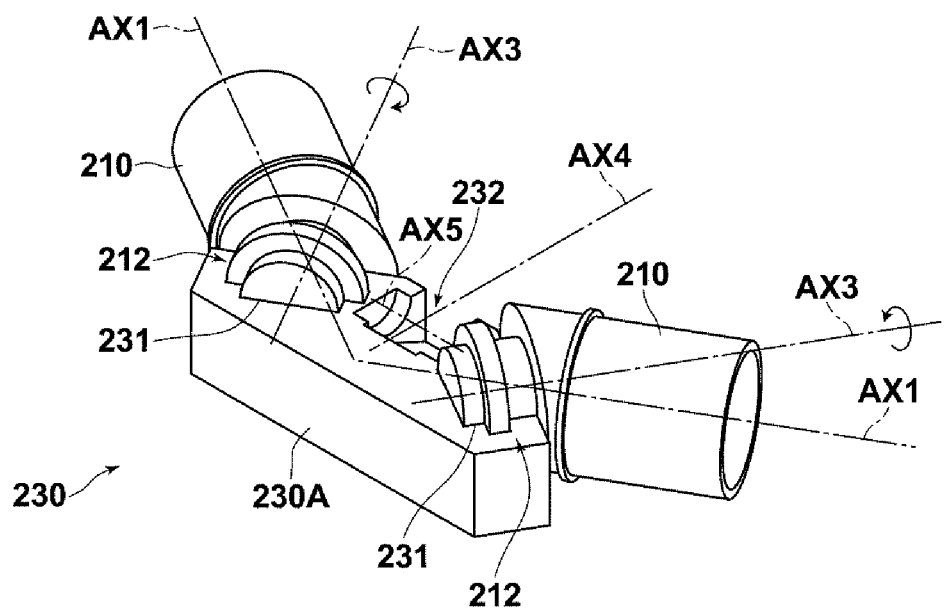
FIG. 20B is an exploded perspective view of the second coupling unit illustrating only one of second main bodies.

In FIG. 20A and FIG. 20B the first end portion 311 of the intermediate rod 310 is omitted. In FIG. 20A and FIG. 20B, only the second axis AX4 is illustrated as an element related to the first end portion 311. The second main body 230A includes a second intermediate notch 232, for receiving the unillustrated first end portion 311, between the left and the right second notches 231. The second intermediate notch 232 has the same shape as the first intermediate notch 222 and thus the description thereof is omitted.

In the first embodiment, a protrusion structure is formed on the side of the second end portion 212, and a hole structure is formed on the side of the second main body 230A. Alternatively, the hole structure may be on the side of the second end portion 212, and the hole structure may be on the side of the second main body 230A. The rotation unit 240 may have the second main body 220A divided so that a portion including the second intermediate notch 232 can rotate about the first axis AX1.

Figure 21:
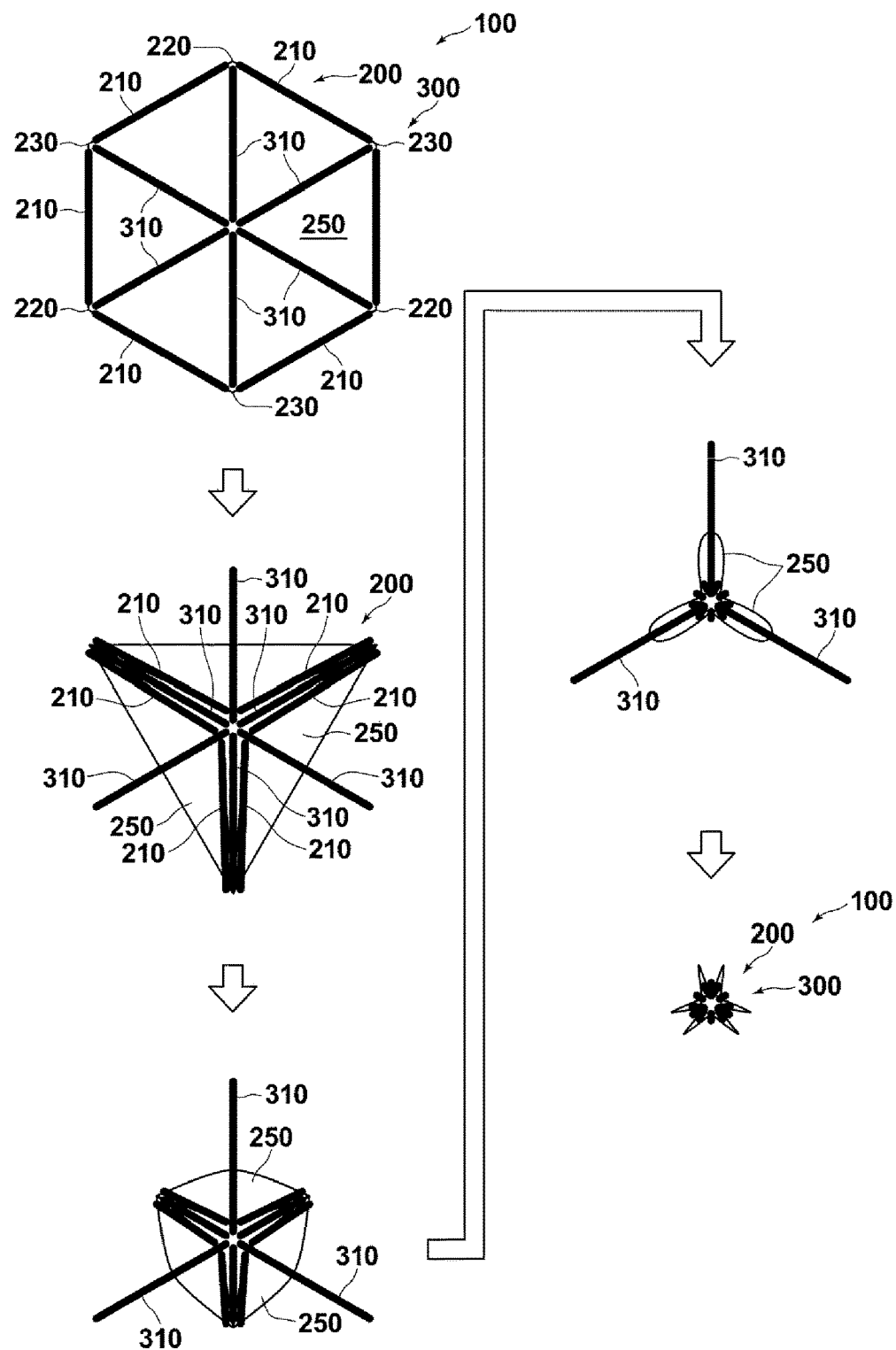
FIG. 21 is a schematic view of a frame structure having a regular hexagonal shape as viewed from a bottom surface side.
Figure 22:
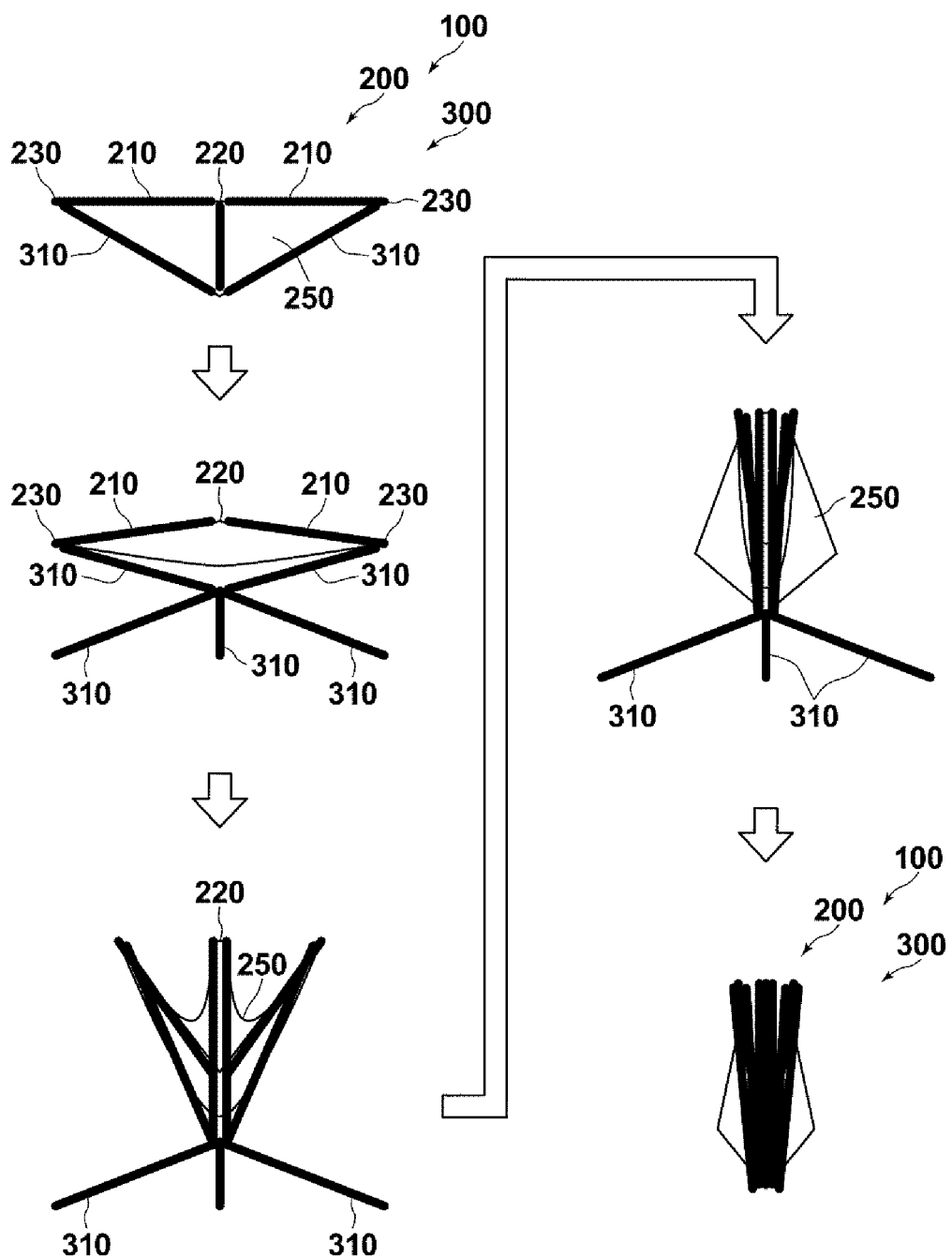
FIG. 22 is a schematic view of a frame structure having the regular hexagonal shape as viewed from a front surface side.

Actions of the frame structure 100 are described. FIG. 21 and FIG. 22 are schematic views of the frame structure 100 respectively viewed from a bottom surface side and a front surface side. In FIG. 21 and FIG. 22, the lower structure 400 is omitted.

In the unfolded state with the regular hexagonal shape, the three intermediate rods 310, coupled to the first coupling unit 220, are detached. The upper rods 210 are rotated about the diagonal axis AX3 (see FIG. 9) to be folded toward the inner side of the regular hexagonal shape, by means of the second coupling means 230.

Then, the upper rods 210 are rotated about the orthogonal axis AX2 (see FIG. 9) by means of the first coupling unit 220 to approach each other, and are rotated about the first axis AX1 (see FIG. 9).

Then, the intermediate rods 310 detached converge at the center to be folded into a single column shape as a whole. The unfolding can be implemented by performing a procedure opposite to that described above in the folded state.

Figure 23:
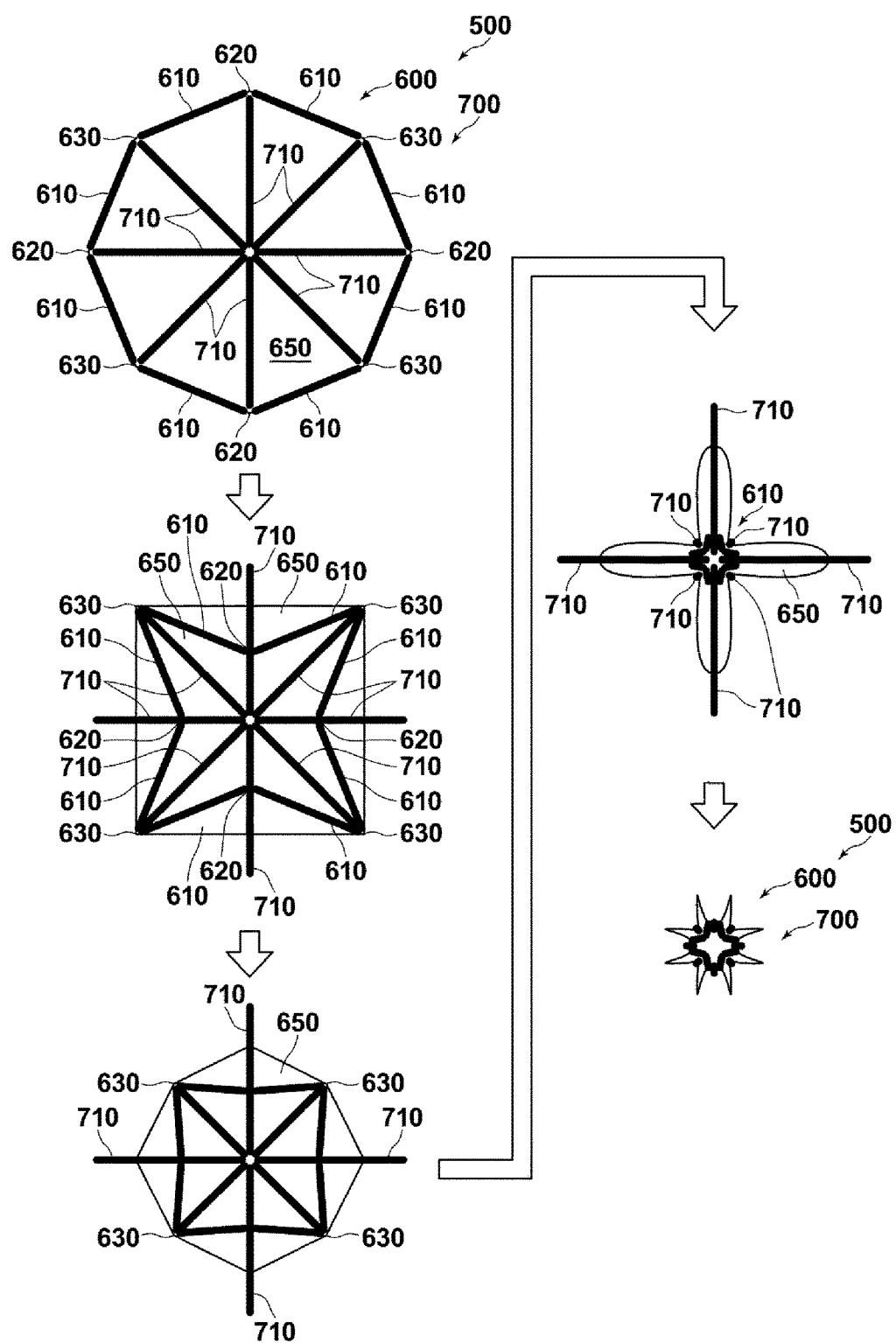
FIG. 23 is a schematic view of a frame structure having a regular octagonal shape as viewed from the bottom surface side.

Next, actions of a frame structure 500 having a regular octagonal unfolded shape are described. FIG. 23 is a schematic view of the frame structure 500 as viewed from the bottom surface side. The frame structure 500 includes an upper structure 600 and an intermediate structure 700.

The upper structure 600 includes eight upper rods 610, four first coupling means 620, four second coupling means 630, unillustrated eight rotation means, and a flexible sheet 650. The intermediate structure 700 includes eight intermediate rods 710 and an unillustrated third coupling mean.

In the unfolded state of the regular hexagonal shape, the four intermediate rods 710, coupled to the first coupling mean 620, are detached. Then, the upper rods 610 are rotated about the diagonal axis to be folded toward the inner side of the regular octagonal shape, by means of the second coupling means 630.

Then, the upper rods 610 are rotated about the orthogonal axis to approach each other, and are rotated about the axis by means of the first coupling mean 620. The orthogonal axis is an axis orthogonal to the axes of both upper rods 610, as in the case of the regular hexagonal shape.

Then, the intermediate rods 610 detached converge at the center to be folded into a single column shape as a whole. The unfolding can be implemented by performing a procedure opposite to that described above in the folded state.

Figure 24A:
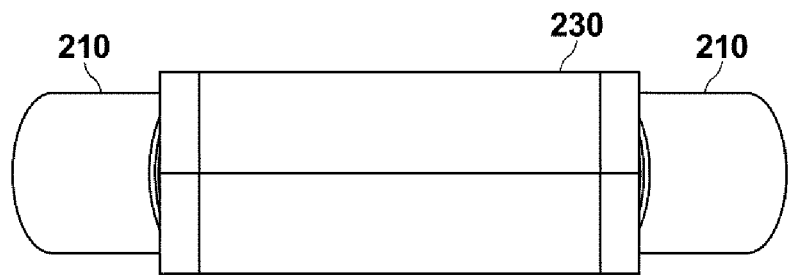
FIG. 24A is a front view of the second coupling unit.
Figure 24B:
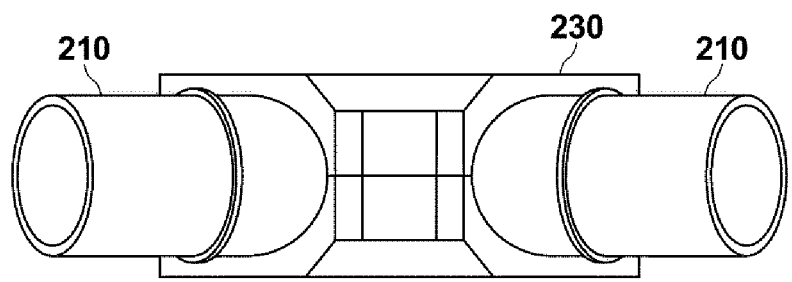
FIG. 24B is a back view of the second coupling unit.
Figure 24C:
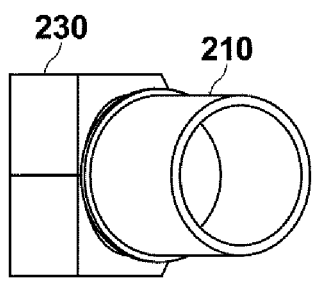
FIG. 24C is a right-side view of the second coupling unit.
Figure 24D:
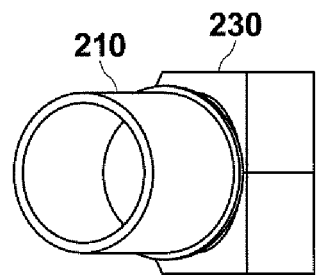
FIG. 24D is a left-side view of the second coupling unit.
Figure 24E:
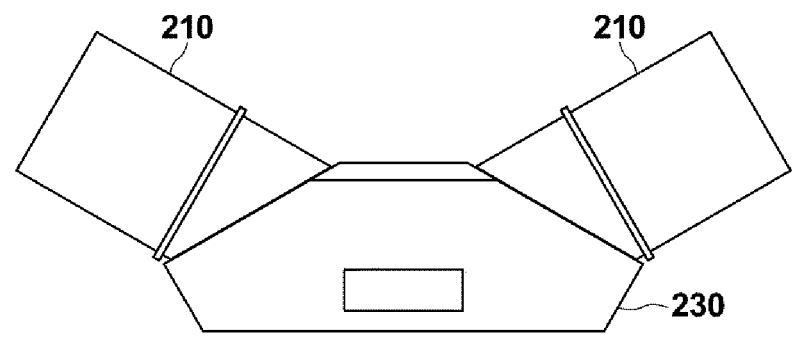
FIG. 24E is a plan view of the second coupling unit.
Figure 24F:
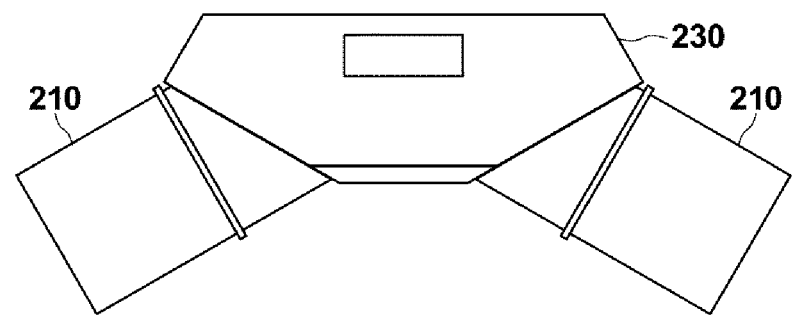
FIG. 24F is a bottom view of the second coupling unit.

FIG. 24A is a front view of the second coupling mean 220. FIG. 24B is a back view of the second coupling mean 220. FIG. 24C is a right-side view of the second coupling mean 220. FIG. 24D is a left-side view of the second coupling mean 220. FIG. 24E is a plan view of the second coupling mean 220. FIG. 24F is a bottom view of the second coupling mean 220.

In the first embodiment described above, the upper structure 200 has a regular hexagonal shape when the six upper rods 210 are unfolded. Thus, a supporting target can be securely and rigidly supported on the regular hexagonal shape. The upper rods 210 can be bent about the diagonal axis AX3 and bent about AX2 while rotating about the axis AX1 to be folded into a single column state as a whole. Thus, the structure can be stored while being in a compact state.

In the first embodiment, the six intermediate rods 310 are provided and thus six truss structures are defined, with the upper rods 210 and the intermediate rods 310, on the lower side of the regular hexagonal shape, whereby higher rigidity can be achieved in the unfolded state.

In the first embodiment, the flexible sheet 250 is provided, and thus no supporting plate or the like is required to be prepared on the regular hexagonal shape in the unfolded state, whereby higher usability can be achieved.

Figure 25:
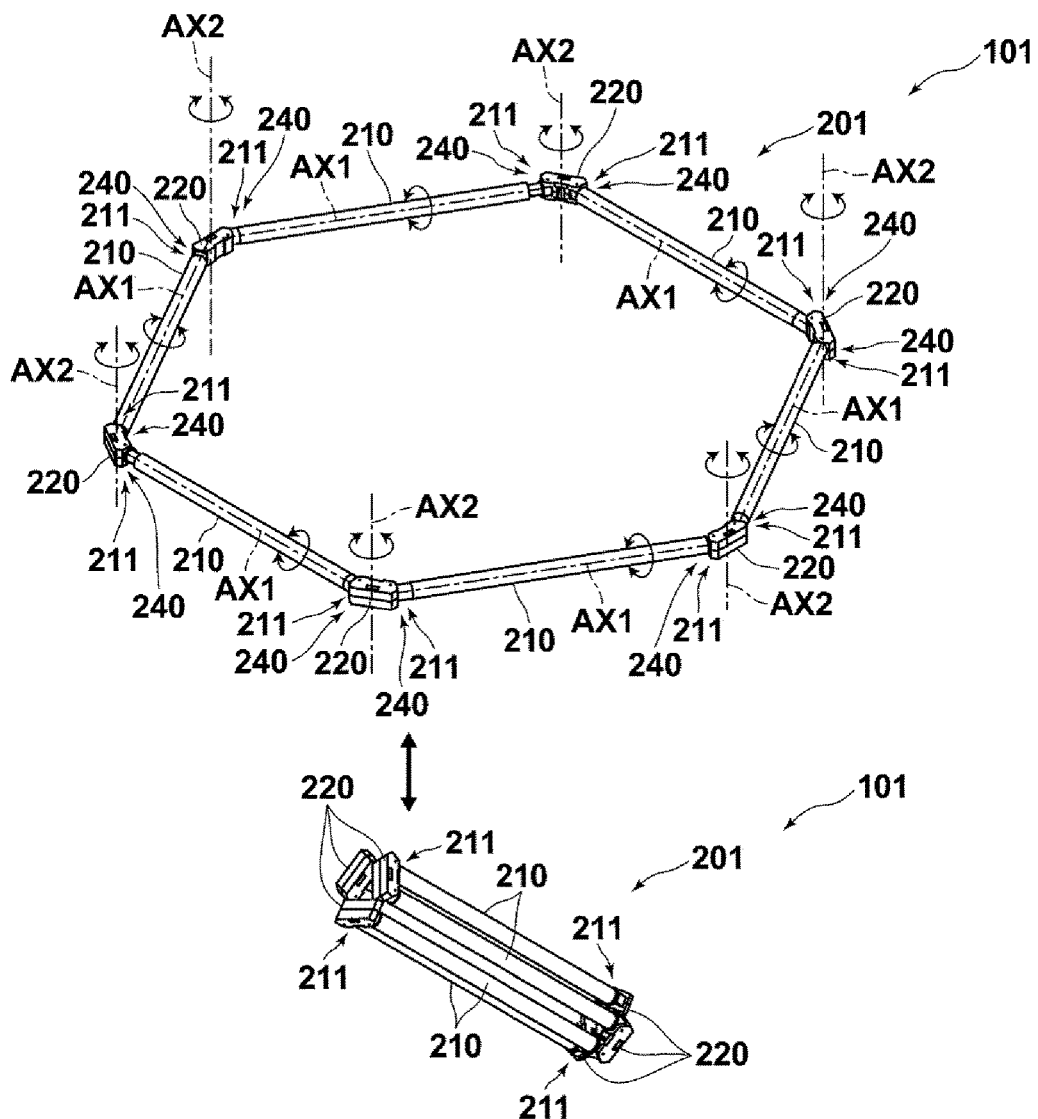
FIG. 25 is a diagram illustrating each of an unfolded state and a folded state of a frame structure consisting of an upper structure according to a second embodiment of the present invention.
Figure 26:
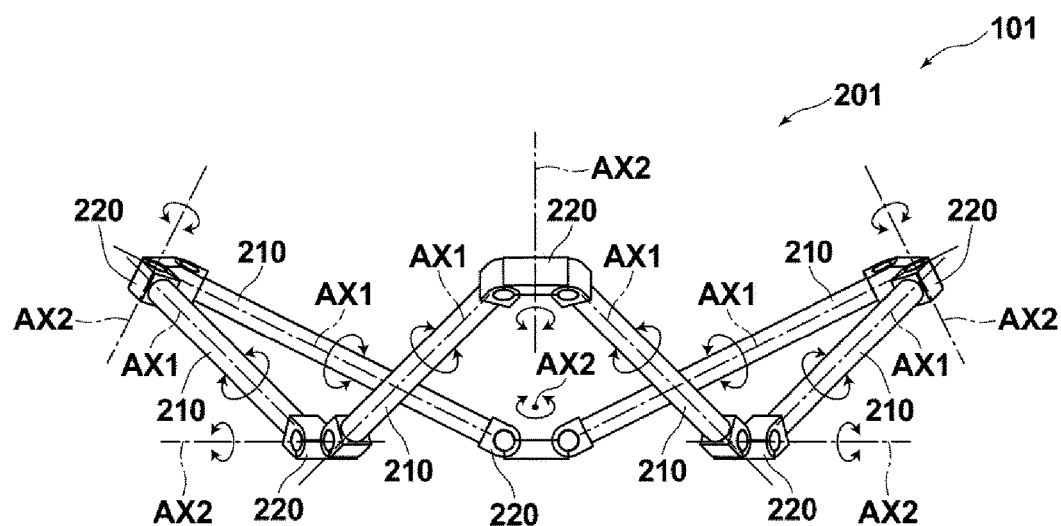
FIG. 26 is a diagram illustrating an intermediate state of the frame structure consisting of the upper structure according to the second embodiment of the present invention during unfolding and folding.

A frame structure 101 according to a second embodiment of the present invention is described in detail below with reference to the drawings. FIG. 25 is a diagram illustrating each of an unfolded state and a folded state of the frame structure 101 consisting of upper structure 201. FIG. 26 is a diagram illustrating an intermediate state of the frame structure illustrated in FIG. 25 during unfolding and folding. In FIG. 26, components are illustrated with simplified configurations for the sake of description.

The frame structure 101 may include the upper structure 201, the intermediate structure 300, and the lower structure 400, as in the configuration of the frame structure 100 according to the first embodiment. The intermediate structure 300 is provided on the lower side of the upper structure 201 and supports the upper structure 201. The lower structure 400 is coupled to the intermediate structure 300 and is installed on the ground. As illustrated in FIG. 25, the frame structure 101 may have the upper structure 201 directly installed on the ground, so that the upper structure 201 solely serves as the frame structure. Alternatively, as illustrated in FIG. 10 described above in the first embodiment, the frame structure 101 may have the upper structure 201 and the intermediate structure 300 serving as a frame structure used outside of the earth's atmosphere or in a space for containing liquid such as water, oil, or the like as illustrated in FIG. 10.

The upper structure 201 is described by mainly referring to FIG. 25 and FIG. 26. The upper structure 201 illustrated in FIG. 25 and FIG. 26 is obtained by changing the second coupling mean 230 of the upper structure 200 illustrated in FIG. 9 into the first coupling mean 220, and has the same components denoted with the same reference numerals. The first coupling mean 220 corresponds to a coupling mean according to the present invention.

The upper structure 201 is unfolded into a regular hexagonal planar plate shape defined with six upper rods coupled to each other, and includes six first coupling means 220 and six rotation means 240. Each of the first coupling means 220 is provided at a corresponding one of the apices of the regular hexagonal shape and couples the first end portions 211 of two adjacent upper rods 210 to each other at the apex. The rotation means 240 enable the upper rods 210 to rotate about the first axis AX1.

The first axis AX1 is a center axis of the upper rod 210 extending in a longitudinal direction passing through the center of the upper rod 210. The upper rods 210 are elongated column members having substantially the same length. The length and the thickness of the upper rod 210 are changed in accordance with an application, such as a space structure, recreational equipment, and a furniture, and thus are not particularly limited.

The upper rod 210 has a circular cross-sectional shape in a direction orthogonal to the first axis AX1. The cross-sectional shape of the upper rod 210 is not limited, and may be an elliptical shape, a rectangular shape, or the like for example. The upper rod 210 may be a solid member or a hollow member such as a pipe for example. The material of the upper rod 210 is not limited as long as the material has rigidity. For example, a material such as metal, wood, and resin may be used.

The first coupling means 220 are each disposed at a corresponding one of the apices of the regular hexagonal shape. The first coupling mean 220 is coupled to and holds the first end portion 211 in such a manner that the upper rod 210 as the target of coupling and holding can rotate about an orthogonal axis AX2. The orthogonal axis AX2 is an axis orthogonal to the first axes AX1 of both upper rods 210 as the targets of coupling and holding. With the two adjacent upper rods 210 being rotatable about the orthogonal axis AX2, the two adjacent upper rods 210 can move in directions to minimize (substantially 0°) and maximize (approximately 120°) the angle formed between the two upper rods 210.

The rotation mean 240 enables the main body of the upper rod 210 to rotate about the first axis AX1 at a portion close to the first end portion 211. Specifically, the rotation mean 240 is a mechanism that enables the first coupling mean 220 to rotate about the first axis AX1 relative to the main body of the upper rod 210, and is the same as the rotation mean 240 according to the first embodiment. In the configuration according to the second embodiment, the main body of each upper rod 210 can rotate about the first axis AX1 relative to the two first coupling mean 220 holding both end portions 211 of the upper rod 210, by means of the rotation means 240 provided close to the both end portions 211 of each upper rod 210, as in the first embodiment. However, it is only required in the present invention that the main body of each upper rod 210 is rotatable about the first axis AX1 relative to at least one of the two first coupling mean 220 holding the both end portions 211 of the upper rod 210. For example, the rotation mean 240 may be provided close to only one end portion (first end portion) 211 of the upper rod 210.

The upper structure 201 transitions to a state illustrated in FIG. 26 where the first coupling means 220 are raised in an alternating pattern from the unfolded state illustrated in an upper figure in FIG. 25, when the upper rods 210 are pivoted about the orthogonal axis AX2 by means of the first coupling mean 220 in such a manner that the angle formed between two adjacent upper rods 210 is minimized, while rotating the upper rods 210 about the first axis AX1 by means of the rotation mean 240.

The upper structure 201 transitions to the folded state illustrated in a lower figure in FIG. 25 from the state illustrated in FIG. 26, when the upper rods 210 are further moved close to each other so that the three first coupling means 220, in the alternating pattern, move toward each other to be finally folded into a single columnar shape as a whole.

The upper structure 201 has no mechanism for rotating the upper rod 210 about any axis other than the first axis AX1 and the orthogonal axis AX2. Thus, transition into a shape other than the regular hexagonal unfolded shape, a folded shape (single column member), and an intermediate shape between these states is restricted.

Figure 27:
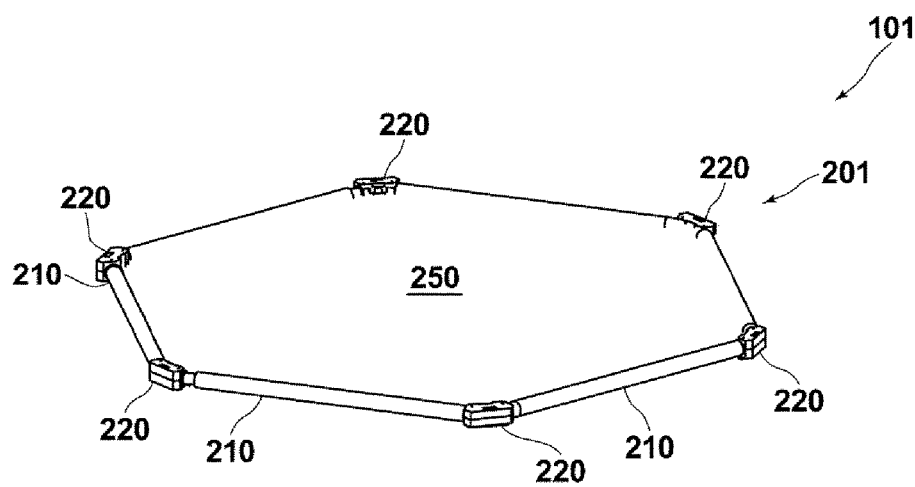
FIG. 27 is a perspective view of the frame structure illustrated in FIG. 26 including a flexible sheet.

As illustrated in FIG. 27, the frame structure 101 may include the flexible sheet 250, having substantially the same shape as the regular hexagonal shape, to cover the upper structure 201. The material of the sheet 250 is not limited as long as the sheet can have flexibility, and thus may be cloth or resin such as nylon or vinyl. The sheet 250 may have a meshed structure.

The sheet 250 is attached to the upper rods 210 to cover the inner side of the regular hexagonal shape in the unfolded state. The sheet 250 has sides suspended across the upper rods 210 in such a manner that each upper rod 210 can rotate about its axis. The sheet 250 may have sides each directly fixed to the upper rod 250, may have sides each provided with a cylindrical portion in which the upper rod 210 is inserted, may have sides each joined to the upper rod 210 with a rope, a string material, or a hook-and-loop fastener, or may employ other known methods, as long as each upper rod 210 can rotate about its axis. The sheet 250 is flexible and thus can be attached to the upper rods 210 while ensuring that the upper structure 201 is foldable and unfoldable. The sheet 250 receives no tension when the upper structure 201 is in the folded state (see the lower figure in FIG. 25) and in an intermediate state (see FIG. 26) during the folding or the unfolding, and gradually receives the tension as the unfolding operation of the upper structure 201 proceeds. Thus, when the unfolded state is achieved, the sheet 250 receives tension large enough to maintain the planar form without slacking even when a large load is received (see the upper figure in FIG. 25).

The sheet may be designed to have the 2N-sided polygonal shape (N being an integer equal to or larger than 2) when the upper structure has the 2N-sided polygonal unfolded shape (N being an integer equal to or larger than 2). The upper structure 200 to support a heavy member or the like may include, instead of the sheet 250, a planar plate with high rigidity, made of metal, wood, or the like, serving as a supporting plate.

The upper rod 210 is preferably extendable and contractible in the first axis direction AX1. A risk of the rotations being hindered by tension of the sheet 250 can be reduced with the upper rod 210 contracting in the first axis direction AX1 while the unfolding or the folding is in process. Then, the sheet 250 can receive sufficient tension with the upper rod 210 extended in the first axis direction AX1 after the unfolding. Specifically, the upper rod 210 is preferably extendable and contractible by about 3 to 10% of the maximum entire length in the first axis direction AX1.

Figure 28:
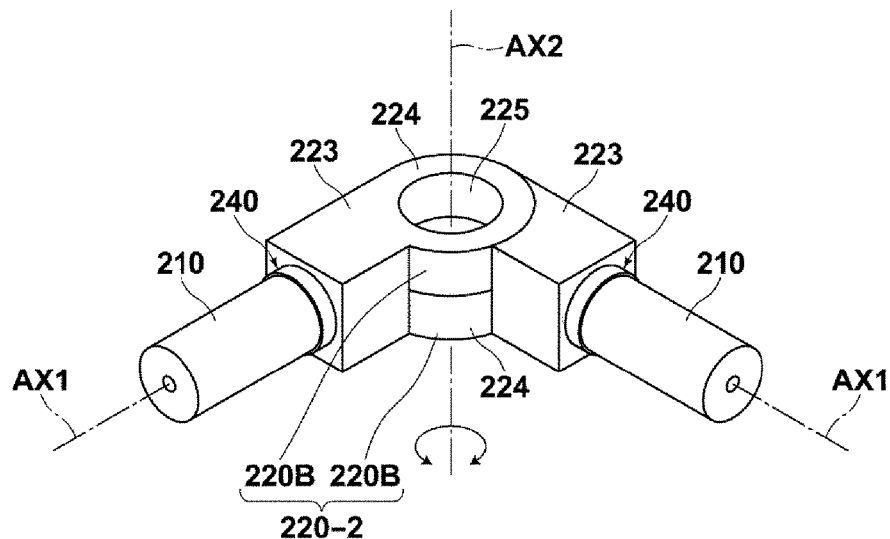
FIG. 28 is an enlarged perspective view of a portion around a first coupling unit according an alternative embodiment.

The first coupling mean 220 according to the second embodiment, having the configuration described above, may have other configurations as long as the first end portions 211 of the two adjacent upper rods 210 can be held in such a manner that the upper rods 210 can rotate about the orthogonal axis AX2. FIG. 28 is an enlarged perspective view of a portion around a first coupling mean 220-2 according to the second embodiment.

As illustrated in FIG. 28, the first coupling mean 220-2 is a structure obtained with two first main bodies 220B that are the same parts combined with each other. The first main body 220B includes a corner portion 223 to which the first end portion 211 of the upper rod 210 is fixed, and a circular portion 224 having approximately half the thickness of the corner portion 223 and extending from the corner portion 223. The circular portion 224 has a substantially center portion provided with a hole 225 having the center substantially matching the orthogonal axis AX2.

When the first coupling mean 220-2 according to the second embodiment is employed, the first end portion 211 of the upper rod 210 is formed as a cylindrical member having a circular cross-sectional shape in a direction orthogonal to the first axis AX1, as in the case of the main body of the upper rod 210. The shape of the first end portion 211 is not limited to the cylindrical member, and may have a tubular shape or a polygonal column shape.

The corner portion 223 has a recess that fits with the first end portion 211, in an end surface where the first end portion 211 is fixed. The first main body 220B holds the first end portion 211 with the first end portion 211 fit in the recess.

The circular portions 224 of the first main bodies 220B having the configuration described above are overlapped with each other, and an unillustrated pin is inserted through the holes 225 of the two circular portions 224 overlapped with each other. The pin has both ends provided with retainers so as not to fall off from the circular portions 224. A clearance in an axial direction of the pin, large enough to enable the two first main bodies 220B to slide with each other, is provided to the retainer. Similarly, a clearance, large enough to enable the two first main bodies 220B to slide relative to each other, is provided between the pin and the hole 225.

As a modification of the second embodiment, the first coupling mean 220-2 having the configuration described may be employed. The two adjacent upper rods 210 are movable in directions minimizing (approximately 0°) and maximizing (approximately 120°) the angle formed therebetween, also by means of the first coupling mean 220-2.

Figure 29:
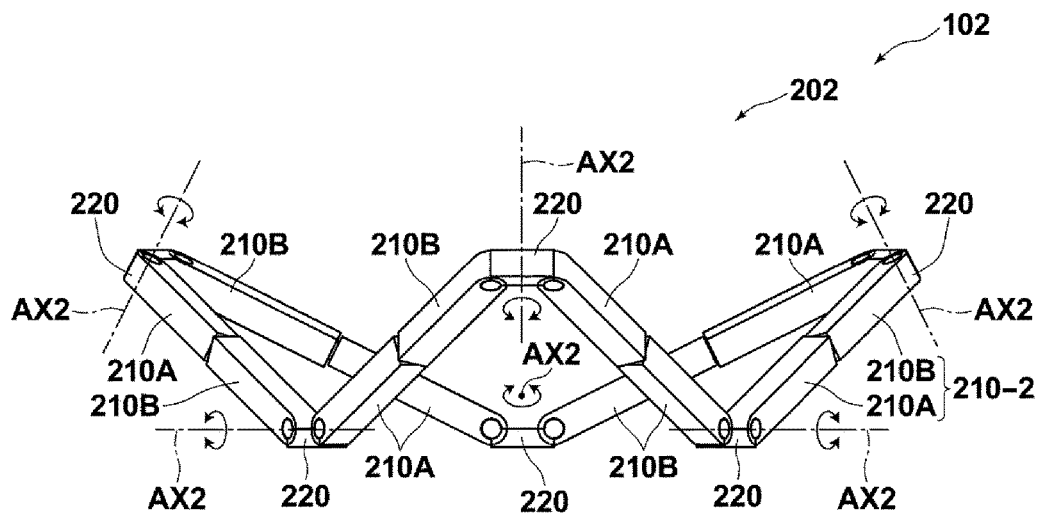
FIG. 29 is a diagram illustrating an intermediate state of a frame structure consisting of an upper structure according to a third embodiment of the present invention during unfolding and folding.

In the second embodiment, the upper structure 201 includes the rotation means 240. However, this should not be construed in a limiting sense. A frame structure 102 according to a third embodiment of the present invention is described below in detail with reference to the drawings. FIG. 29 is a diagram illustrating an intermediate state of the frame structure 102 during unfolding and folding. The shapes of the frame structure 102 according to the present embodiment in the unfolded state and the folded state are the same as those described with reference with FIG. 25, expect for the shape of upper rods, and thus will be omitted in the figure. In FIG. 29, the configuration of the components is simplified for the sake of description, as in FIG. 26.

The frame structure 102 may include an upper structure 202, the intermediate structure 300, and the lower structure 400, as in the configuration of the frame structure 101 described above, and may include a strut structure 800 (described later) provided to the upper structure 202. The intermediate structure 300 is provided on the lower side of the upper structure 202 and supports the upper structure 202. The lower structure 400 is coupled to the intermediate structure 300 and is installed on the ground. The upper structure 202 may be directly installed on the ground, so that the upper structure 202 solely serves as the frame structure. Alternatively, the frame structure 102 may have the upper structure 202 and the intermediate structure 300 serving as a frame structure used outside of the earth's atmosphere or in a space for containing liquid such as water, oil, or the like as illustrated in FIG. 10 described above in the embodiment.

The upper rods according to the third embodiment have a circular cross-sectional shape in the direction orthogonal to the first axis AX1, whereas the upper rod according to the third embodiment has a rectangular cross-sectional shape. The upper structure 202 according to the third embodiment is unfolded into a regular hexagonal planar shape defined with six upper rods 210-2 coupled to each other, as in the same case of the upper structure 201 according to the second embodiment, and includes the six first coupling means 210-2 and the six first coupling means 220. Each of the first coupling means 220 is provided to a corresponding one of apices of the regular hexagonal shape and couples the first end portions 211 of two adjacent upper rods 210-2 to each other at the apex. The upper rods 210-2 are elongated column members having substantially the same length. The length and the thickness of the upper rod 210 are changed in accordance to an application, such as a space structure, recreational equipment, and a furniture, and thus are not particularly limited. The first coupling mean 220 may be the same as those in the first and the second embodiments.

As illustrated in FIG. 29, the upper rod 210-2 according to the third embodiment has a rectangular cross-sectional shape in the direction orthogonal to the first axis AX1, and is divided into a first upper rod 210A and a second upper rod 210B at substantially the center of the upper rod 210-2 in the first axis AX1 direction. End portions of the first upper rod 210A and the second upper rod 210B positioned on the side of the first coupling mean 220 each correspond to the first end portion 211 described above. In the third embodiment, the rotation means 240 according to the second embodiment are not provided. The first end portion 211 and the first upper rod 210A or the second upper rod 210B may be fixed to each other with a protrusion or a recess in the direction along the first axis AX1 provided on the side of the first end portion 211 and a recess or a protrusion in the direction along the first axis AX1 provided on the side of the main body, and the protrusion and the recess fit to each other, or may be fixed to each other with a known mechanism. The first end portion 211 may be integrally formed with the first upper rod 210A or the second upper rod 210B.

The first upper rod 210A and the second upper rod 210B have end surfaces facing each other each provided with an unillustrated cylindrical protrusion or cylindrical recess. The first upper rod 210A and the second upper rod 210B are relatively rotatable about the first axis AX1 with the protrusion fit in the recess. A clearance, large enough to enable the first upper rod 210A and the second upper rod 210B to slide relative to each other, is provided between the protrusion and the recess. How the first upper rod 210A and the second upper rod 210B are connected to each other is not limited to this. For example, the first upper rod 210A and the second upper rod 210B may have end surface facing each other provided with cylindrical recesses, and the first upper rod 210A and the second upper rod 210B may be rotatably connected to each other with a cylindrical pin (not illustrated) inserted in both of these recesses. In this configuration, a clearance, large enough to enable the first upper rod 210A and the second upper rod 210B to slide relative to each other, is provided between the pint and the recess.

In the third embodiment, the upper rod 210-2 is divided into a first upper rod 210A and a second upper rod 210B at substantially the center in the first axis AX1 direction. However, the present invention is not limited to this. The dividing may be at any position as long as the first upper rod 210A and the second upper rod 210B are relatively rotatable with each other. The upper rod 210-2, divided into two sections (the first upper rod 210A and the second upper rod 210B) in present embodiment, may be divided into three or more sections.

The upper structure 202 transitions to the state illustrated in FIG. 29 where the first coupling means 220 are raised in an alternating pattern from the unfolded state (see the upper figure in FIG. 25) when the upper rods 210-2 are pivoted about the orthogonal axis AX2 so that the angle formed between two adjacent upper rods 210-2 is minimized by means of the first coupling mean 220, with the first upper rod 210A and the second upper rod 210B rotating relative to each other about the first axis AX1, that is, rotating in such a manner that a state where the rectangular cross-sectional surfaces of the first upper rod 210A and the second upper rod 210B facing each other match transitions to a state where the surfaces no longer match.

The upper structure 202 transitions to the folded state illustrated in the lower figure in FIG. 25 from the state illustrated in FIG. 29, when the upper rods 210-2 are further moved close to each other so that the three first coupling means 220, in the alternate pattern, move toward each other to be finally be folded into a single columnar shape as a whole.

The upper structure 200 has no mechanism for rotating the upper rod 210-2 about any axis other than the first axis AX1 and the orthogonal axis AX2. Thus, transition into a shape other than the regular hexagonal unfolded shape, a folded shape (single column member), and an intermediate shape between these states is restricted.

In the third embodiment, the first upper rod 210A and the second upper rod 210B each have a rectangular cross-sectional shape in the direction orthogonal to the first axis AX1. The cross-sectional shape of the first upper rod 210A and the second upper rod 210B is not limited, and may be an elliptical shape, a circular shape, or the like for example. The first upper rod 210A and the second upper rod 210B may be a solid member or a hollow member such as a pipe for example. The material of the first upper rod 210A and the second upper rod 210B is not limited as long as the material has rigidity. For example, a material such as metal, wood, and resin may be used.

The frame structure 101 described above includes the upper structure 201 and the strut structure 800 provided to the upper structure 201. A structure, an architecture, a person, an animal, an item, and the like can be placed on the upper structure 201. Next, the strut structure 800 is described with reference to FIG. 30 to FIG. 34.

Figure 30:
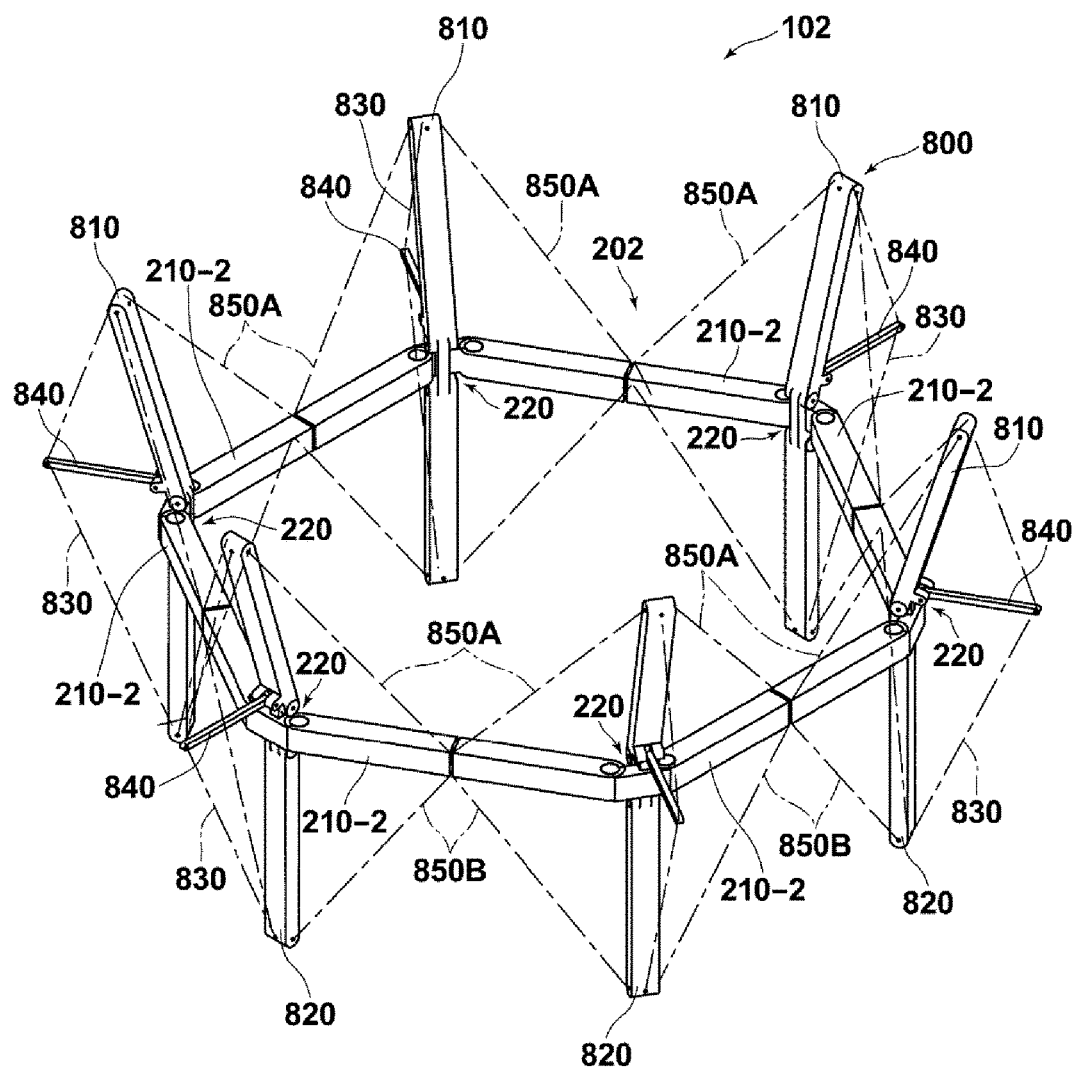
FIG. 30 is a perspective view of the frame structure consisting of the upper structure and a strut structure as viewed from the upper right side.

The strut structure 800 according to the third embodiment is attached to the upper structure 202 according to the third embodiment, but may also be attached to the upper structures 200 and 201 according to the first and the second embodiment. As illustrated in FIG. 30, the strut structure 800 includes six upper rods 810, six lower rods 820, and a single string material 830. The six upper rods 810 stand while having lower ends coupled to and rotatably held by the first coupling means 220 and having upper ends being foldable toward the inner side of the regular hexagonal shape. The six lower rods 820 stand while having upper ends coupled to and rotatably held by the first coupling means 220 and having lower ends being foldable toward the inner side of the regular hexagonal shape. The string material 830 joins the upper ends of the upper rods 810 and the lower ends of the lower rods 820 to each other. The first coupling mean 220 may be coupled to the lower ends of the upper rods 810 and the upper ends of the lower rods 820 with a known mechanism using a hinge, a pin, or the like.

The upper rod 810 and lower rod 820 are elongated column members having substantially the same length. The lengths of the upper rods 810 and the lower rods 820 are not particularly limited as in the case of the upper rod 210. Each of the upper rod 810 and lower rod 820 has a rectangular cross-sectional shape in a direction orthogonal to its axis.

The cross-sectional shape of the upper rod 810 and the lower rod 820 is not limited, and may be an elliptical shape, a circular shape, or the like for example, as in the case of the upper rod 210. The upper rod 810 and the lower rod 820 may be a solid member or a hollow member such as a pipe for example. The material of the upper rod 810 and the lower rod 820 is not limited as long as the material has rigidity. For example, a material such as metal, wood, and resin may be used. The string material 830 is not limited as long as the material has rigidity, and may be a wire, a rope, or the like for example.

At the first coupling mean 220, the lower end of the upper rod 810 can rotate about the rotational axis orthogonal to the axis of the upper rod 810, and the upper end of the lower rod 820 can rotate about the rotational axis orthogonal to the axis of the lower rod 820.

Figure 31A:
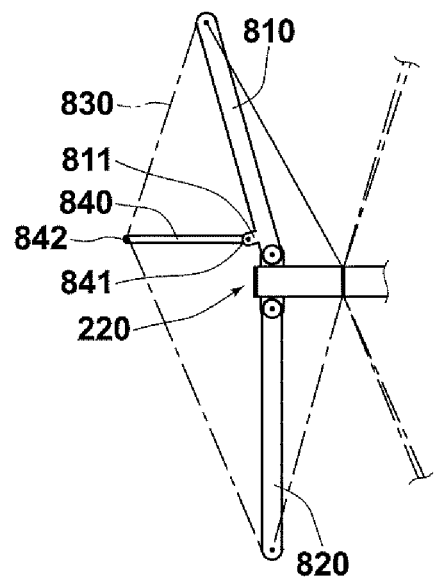
FIG. 31A is an enlarged perspective view of a part of the strut structure to which tension is applied by means of a tension lever.

The string material 830 is provided with a tension lever 840 serving as a tension application mean that applies tension to the string material 830. As illustrated in FIG. 30 and FIG. 31A, the tension lever 840 has a first end 841 and a second end 842. The first end 841 is supported by an outer facing portion of the lower end portion of the upper rod 810 while being able to rotate about an axis in parallel with the plane of the regular hexagonal shape of the upper structure 202 and orthogonal to a line between the center of the regular hexagonal shape and the outer facing portion of the lower end portion of the upper rod 810. The second end 842 is slidably engaged with a center portion of the string material 830. Thus, the tension lever 840 is configured to have the second end 842 movable in the upper and lower direction on the outer side of the regular hexagonal shape of the upper structure 202. In the present embodiment, the tension lever 840 has the first end 841 provided to the outer facing surface of the lower end portion of the upper rod 810. However, the present invention is not limited to this. The tension lever 840 may be rotatably supported by the outer facing portion of the first coupling mean 220, or may be rotatably supported by the outer facing portion of the upper end portion of the lower rod 820. The tension lever 840 is preferably provided close to the first coupling mean 220. Specifically, a range between the lower end portion of the upper rod 810 and the upper end portion of the lower rod 820 is set to be a range between a position at ⅔ from the upper end of the upper rod 810 and a position at ⅔ from the lower end of the lower rod 820 including the first coupling mean 220.

Figure 31B:
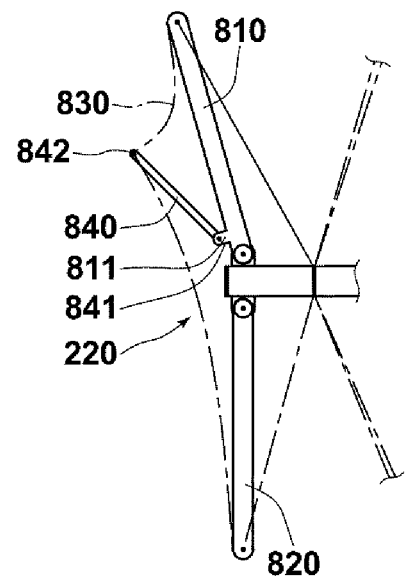
FIG. 31B is an enlarged perspective view of the part of the strut structure to which no tension is applied by means of the tension lever.

When the second end 842 of the tension lever 840 is not pressed downward, that is, when the tension lever 840 is diagonally arranged with the second end 842 on the upper side as illustrated in FIG. 31B, the string material 830 receives no tension and thus is slacked. In this state, the upper rod 810 and the lower rod 820 is rotatable relative to the first coupling mean 220, and thus can be folded toward the inner side of the regular hexagonal shape defined by the upper structure 202.

When the second end 842 of the tension lever 840 is pressed downward so that the tension lever 840 is positioned substantially in parallel with the plane of the regular hexagonal shape of the upper structure 202, that is, positioned substantially horizontally as illustrated in FIG. 31A, tension is applied to the string material 830 engaged with the second end 842. In the state where the tension is applied to the string material 830 by means of the tension lever 840, the string material 830 pulls the upper ends of the upper rods 810 and the lower ends of the lower rods 820 toward the outer side of the regular hexagonal shape defined by the upper structure 202. Thus, the upper rods 810 and the lower rods 820 are in a state of not being rotatable relative to the first coupling mean 220 to be securely positioned.

In the state where the tension is applied to the string material 830 as illustrated in FIG. 31A, the upper ends of the upper rods 810 are positioned on the outer side of the regular hexagonal shape defined by the upper structure 202, so that the six upper rods 810 are more open at a position more on the upper side. Thus, a large space can be provided above the sheet 250 provided to the upper structure 202. When a roof sheet (see FIG. 33) is provided to cover the upper ends of the upper rods 810, rain drops are less likely to enter the space above the sheet 250. The lower rods 820 extends downward straight toward the ground.

In the state where the tension is applied to the string material 830 by means of the tension lever 840, that is, in the state illustrated in FIG. 31A, two truss structures can be defined by the upper rod 810, lower rod 820, the tension lever, and the string material 830 at each apex of the regular hexagonal shape, whereby the rigidity of the upper rod 810 and the lower rod 820, that is, the rigidity of the frame structure 102 can be increased.

The strut structure 800 includes an upper string material 850A and a lower string material 850B. The upper string material 850A joins the upper end of each of the six upper rods 810 to intermediate portions of two upper rods 210-2 adjacent to the upper rod 810, that is, the upper rods 210-2 on left and right sides. The lower string material 850B joins the lower end of each of the six lower rods 820 to the intermediate portions of two upper rods 210-2 adjacent to the lower rod 820, that is, the upper rods 210-2 on the left and right sides. The upper string material 850A and the lower string material 850B correspond to second string materials according to the present invention.

The upper string material 850A and the lower string material 850B may be fixed to the upper ends of the upper rods 810, the lower ends of the lower rods 820, and the intermediate portions of the upper rods 210-2, using a material such as a round jumpring fixed and joined, or using any appropriate known fixing method. As illustrated in FIG. 30, the upper string material 850A and the lower string material 850B are designed to have a length set in such a manner that the string materials are tensioned in the state where the tension is applied to the string material 830 by means of the tension lever 840. Thus, in a state where no tension is applied to the string material 830 and thus the upper rods 810 and the lower rods 820 are not completely unfolded as illustrated in FIG. 31B, the upper string material 850A and the lower string material 850B receive no tension and is in a slacked state. The upper string material 850A and the lower string material 850B are not limited as long as the material has rigidity, and may be a wire, a rope, or the like for example.

When the strut structure 800 is provided with the upper string material 850A and the lower string material 850B, four truss structures are further provided in addition to the two truss structures defined by the upper rod 810, the lower rod 820, the tension lever, and the string material 830 at each apex of the regular hexagonal shape in the state where the tension is applied to the string material 830 by means of the tension lever 840, that is, the state illustrated in FIG. 31A. Thus, the rigidity of the upper rods 810 and the lower rods 820, that is, the rigidity of the frame structure 102 can further be increased.

In the third embodiment, the upper string material 850A and the lower string material 850B are coupled to the intermediate portions of the upper rods 210-2. The intermediate portion is not particularly limited. The coupling portion may be at any position between a position, at ⅓ of the distance between the first coupling mean 220 coupled with the upper rod 810 coupled with the upper string material 850A and an adjacent coupling mean, and the adjacent coupling means Specifically, when the upper structure 202 is provided with the sheet 250 or in other like configurations, the upper string material 850A is hard to get in the way of a person entering or exiting the structure, and thus is preferably coupled to the ⅓ position, so that a larger entrance can be provided.

When the strut structure 800 having the configuration described above is in the state where no tension is applied to the string material 830 by means of the tension lever 840, that is, in the state illustrated in FIG. 31B, the upper rods 810 and the lower rods 820 are each bent toward the inner side of the regular hexagonal shape of the upper structure 820 and then the upper structure 202 is folded. Thus, the upper rod 810 and the lower rod 820, coupled to each of the first coupling means 220 illustrated in FIG. 29, follows the first coupling mean 220 to pivot about the first coupling mean 220. Thus, the upper rods 810 and the lower rods 820 approach the upper rods 210-2 as a whole. The upper string material 850A and the lower string material 850B are slacked as a result of the pivoting of the upper rods 810 and the lower rods 820. Thus, the strut structure 800 can be finally folded to be in a single column state, together with the upper structure 202.

Figure 32:
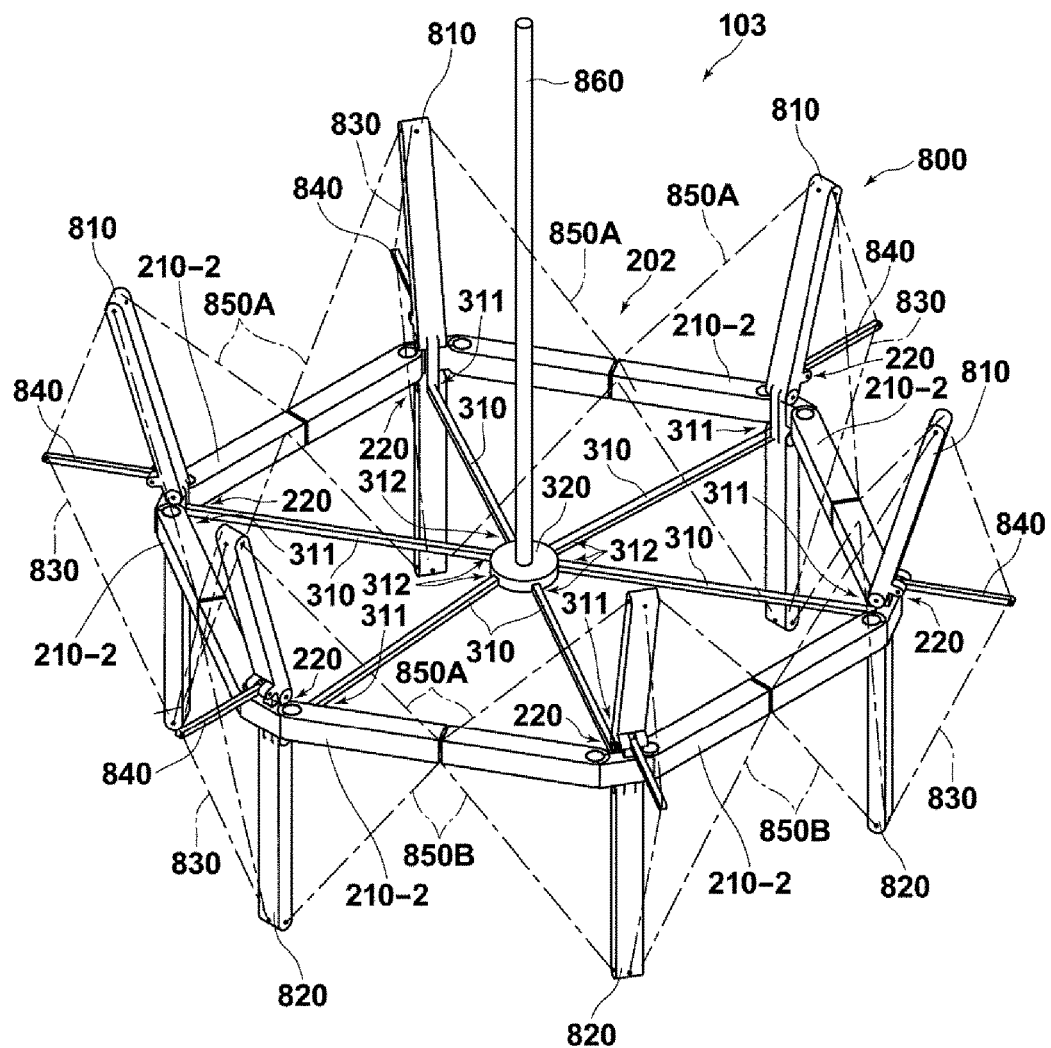
FIG. 32 is a perspective view of the frame structure illustrated in FIG. 30 including the intermediate structure as viewed from the upper right side.
Figure 33:
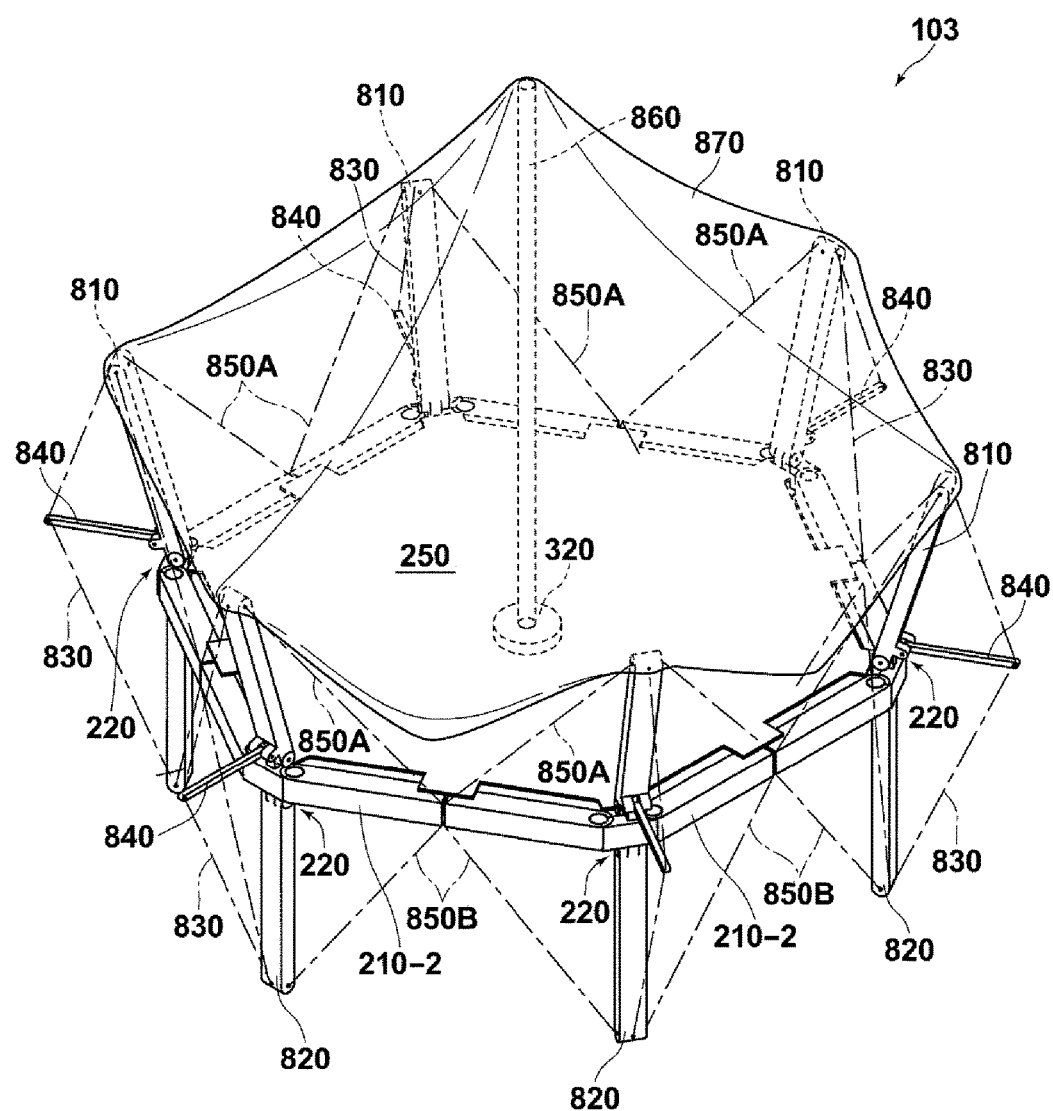
FIG. 33 is a perspective view of the frame structure illustrated in FIG. 32 including the sheet and a roof sheet as viewed from the upper right side.

In the present invention, the frame structure 102 can be further be provided with the intermediate structure 300 described above. A frame structure 103 according to a fourth embodiment of the present invention is described with reference to the drawings. FIG. 32 is a perspective view of the frame structure 103 including the intermediate structure 300 as diagonally viewed from the upper right side. FIG. 33 is a perspective view of the frame structure 103 including the intermediate structure 300, the sheet 250, and a roof sheet 870 as diagonally viewed from the upper right side. In the present embodiment, the upper structure 202 is provided with the sheet 250.

As illustrated in FIG. 32 and FIG. 33, the frame structure 103 includes the upper structure 202, the strut structure 800, the intermediate structure 300, the sheet 250, a pole 860, and the roof sheet 870. As illustrated in FIG. 32, the frame structure 103 includes the intermediate structure 300 including the six intermediate rods 310 and the third coupling mean 320. The six intermediate rods 310 have the first end portions 311 coupled to and rotatably held by the first coupling means 220. The second end portions 312 of the intermediate rods 310 converge at, coupled to, and rotatably held by the third coupling mean 320. The intermediate structure 300 has a configuration similar to the configuration of that provided to the frame structure 100 according to the embodiment described above, and thus will not be described in detail below.

The third coupling mean 320 of the intermediate structure 300 has a circular shape, and has a circular upper surface to which the pole 860 is detachably attached. As illustrated in FIG. 32, the pole 860 is designed to have a longer length than the upper rod 810. As illustrated in FIG. 33, the roof sheet 870 is laid over the upper end of the pole 860. The pole 860 extends upward through an unillustrated hole provided at substantially the center of the sheet 250. The hole prevents the pole 860 from falling down. A clearance, large enough to enable the pole 860 to be pulled out from the hole, is provided between the hole and the pole 860.

The roof sheet 870 has a regular hexagonal shape larger than the regular hexagonal shape defined with the upper ends of the upper rod 810. As illustrated in FIG. 33, the roof sheet 870 has a center portion laid on the upper end of the pole 860, and has end portions laid on the upper ends of the upper rod 810. The material of the roof sheet 870 is not limited as long as the sheet can have flexibility, and thus may be cloth or resin such as nylon or vinyl. Preferably, water proofing is performed. The roof sheet 870 may be detachably fixed to the upper ends of the pole 860 and the upper rod 810 with a rope or the like or may be simply laid on these portions. How the roof sheet 870 is provided can be changed as appropriate in accordance with the application.

The roof sheet 870 is flexible, and thus the frame structure 102 can be folded and unfolded while the roof sheet 870 is being attached. The pole 860 is detached before the frame structure 102 is folded. When the frame structure 102 in the folded state is unfolded, the pole 860 is attached after the unfolded state is established. The pole 860 can be used while being provided with various types of lighting equipment, a table, or the like. Although not elaborated in the figure, a side surface sheet may be provided to a circumference plane formed by side planes above the upper structure 202 of the frame structure 103, that is, a plane defined by the upper rods 810. Preferably, the side surface sheet is detachably suspended across the upper rods 810. The material of the side surface sheet is not limited and may be cloth or resin such as nylon or vinyl. The side surface sheet is not particularly limited to a flexible sheet, and may be in a form of a plate. The sheet is preferably waterproofed in case that the frame structure 103 is used for outdoor The frame structure 2 can also be folded and unfolded while the side surface sheet is being attached.

The frame structure 103 may include six lower rods 410 and a string material 420 that couples the lower rods 410 to the third coupling mean 320. The string material 420, which may have the same configuration as the string material 420 used for the lower structure 400, is not particularly limited as long as the material has rigidity, and thus may be a wire, a rope, or the like for example. During the folding, the lower rods 820 are folded to approach the intermediate rod 310, and thus the string material 420 is slacked.

Figure 34:
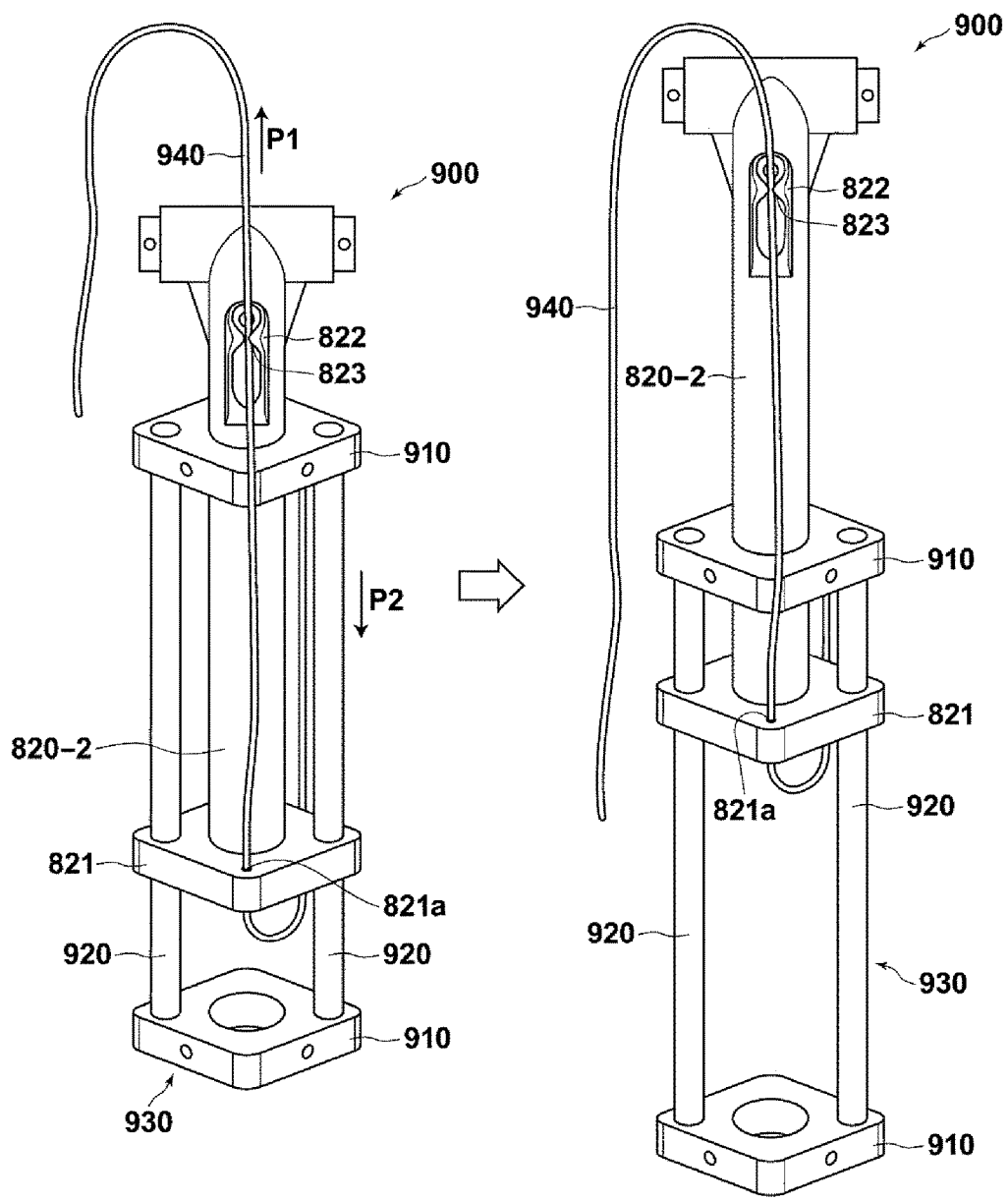
FIG. 34 is a perspective view illustrating a contracted state and an extended state of a lower rod including an extension/contraction mechanism.

In the present invention, the number of the upper rods 810 and the lower rods 820, which is not particularly limited, is preferably three or more so that the frame structure 102, 103 can be securely supported. Preferably, the upper rods 810 extend diagonally upward toward the above and are arranged at an equal interval. The lower rod 820 may be adjustable to be extendable and contractible. FIG. 34 is a perspective view of a lower rod 900 having an extension/contraction adjustment mechanism. Left and right figures in FIG. 34 respectively illustrate a contracted state and an extended state.

The lower rod 900 has an upper end coupled to the first coupling mean 220 and has a lower end provided with a lower rod main body 820-2 including a rectangular fixed plate 821, and includes rectangular movable plates 910 provided to the upper and the lower ends and an extension/contraction member 930 including two movable rods 920 fixed to the two movable plates 910. The fixed plate 821 of the lower rod main body 820-2 is provided with an insertion hole 821a through which a rope 940 described later is inserted. A locking member 822 with which the rope 940 is locked is provided on the upper side of the lower rod main body 820-2. The locking member 822 has an insertion path 823 through which the rope 940 is inserted. The insertion path 823 has an inner surface provided with a plurality of recesses and protrusions. The rope 940 is locked with frictional force provided by the recesses and protrusions. The structure of the locking member 822 is not particularly limited as long as the portion can ensure locking of the rope 940, and may employ a known structure.

The rope 940 is inserted through the insertion hole 821a of the fixed plate 821 and has a distal end fixed to the one of the two movable plates 910 that is positioned on the upper side. The rope 940 may be fixed by being tied to a round jumpring fixed to the movable plate 910 or using a known method.

When the rope 940 is pulled in a direction indicated by an arrow P1 while the lower rod 900 having the configuration described above is in the contracted state illustrated in the left figure in FIG. 34, the upper movable plate 910 fixed to the distal end of the rope 940 is pulled to move in a direction indicated by an arrow P2, that is, downward. Thus, the extension/contraction member 930 as a whole moves downward as illustrated in the right figure in FIG. 34, whereby a state where the lower rod 900 is extended is achieved. In this state, the rope 940 is locked with the locking member 822, whereby the lower rod 900 is held in the extended state.

The lower rod 900 in the extended state illustrated in the right figure in FIG. 34 transitions to the contracted state in the left figure in FIG. 34 when the locking of the rope 940 by the locking member 822 is unlocked and then the lower movable plate 910 is manually pushed upward. The rope 940 is locked with the locking member 822 in the contracted state, whereby the lower rod 900 is held in the contracted state. With the lower rod 900 having the extension/contraction function as described above, the frame structure 102 can be securely installed on a rough and largely uneven ground.

The extension/contraction function of the lower rod is not limited to this, and a known mechanism may be employed.

Figure 35:
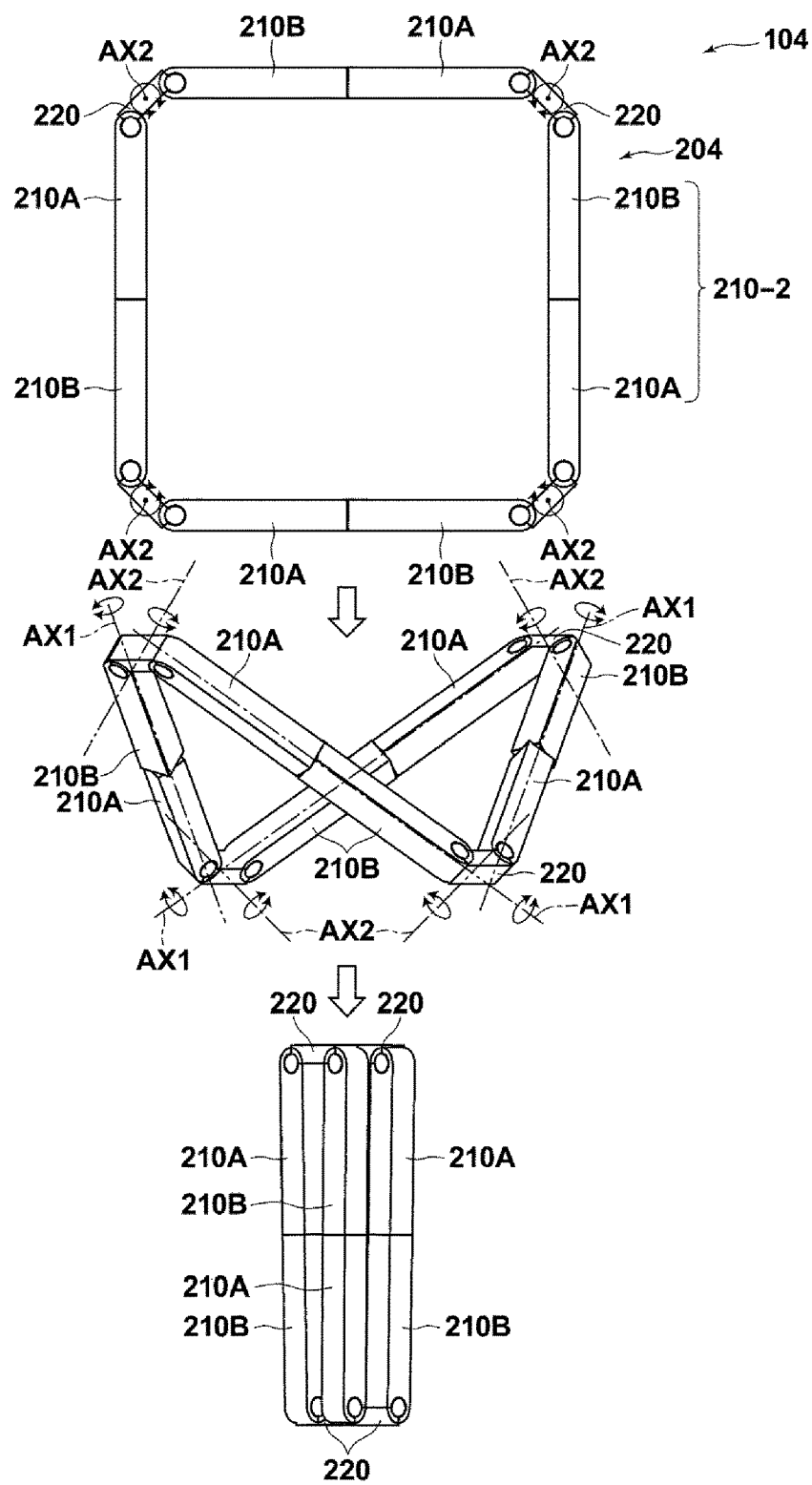
FIG. 35 is a diagram illustrating unfolding and folding of a frame structure consisting of a rectangular upper structure according to a fourth embodiment of the present invention.

Next, a frame structure 104 according to a fifth embodiment of the present invention is described in detail with reference to the drawings. FIG. 35 illustrates unfolding and folding of the frame structure 104 consisting of a rectangular upper structure 204. Configurations that are the same as those in the frame structures 101, 102, and 103 according to the embodiments described above are denoted with the same reference numerals and will be omitted in the description.

The frame structure 104 according to the present embodiment may include the strut structure 800 provided to the upper structure 204, the upper structure 204, the intermediate structure 300, and the lower structure 400, as in the configurations of the frame structures 101, 102, and 103 described above. The intermediate structure 300 is provided on the lower side of the upper structure 204 and supports the upper structure 204. The lower structure 400 is coupled to the intermediate structure 300 and is installed on the ground. The upper structure 204 may be directly installed on the ground, so that the upper structure 204 solely serves as the frame structure. Alternatively, the frame structure 104 may have the upper structure 204 and the intermediate structure 300 serving as a frame structure used outside of the earth's atmosphere or in a space for containing liquid such as water, oil, or the like as illustrated in FIG. 10 described above in the embodiment.

The upper structure 204 of the frame structure 104 is unfolded into a square planar shape defined with four upper rods 210-2 coupled to each other and includes four upper rods 210-2 and the four first coupling means 220. Each of the first coupling means 220 is disposed at a corresponding one of apices of the square and is coupled to and holds the first end portions 211 of two adjacent upper rods 210-2 at the apex.

The upper structure 204 transitions to a state illustrated in a middle figure in FIG. 35 where the first coupling means 220 are raised in an alternating pattern from the unfolded state in the upper figure in FIG. 35 when the upper rods 210-2 are pivoted about the orthogonal axis AX2 to minimize the angle formed between two adjacent upper rods 210-2, with the first upper rod 210A and the second upper rod 210B rotating relative to each other about the first axis AX1, that is, rotating in such a manner that a state where the rectangular cross-sectional surfaces of the first upper rod 210A and the second upper rod 210B facing each other match transitions to a state where the surfaces no longer match.

The upper structure 204 transitions to the folded state illustrated in a lower figure in FIG. 35 from the state illustrated in the middle figure in FIG. 35, when the upper rods 210-2 are further moved close to each other so that the two first coupling means 220 facing each other move toward each other to be finally be folded into a single columnar shape as a whole.

The upper structure 204 has no mechanism for rotating the upper rod 210-2 about any axis other than the first axis AX1 and the orthogonal axis AX2. Thus, transition into a shape other than the square unfolded shape, a folded shape (single column member), and an intermediate shape between these states is restricted.

The frame structure according to the present invention only requires the upper rods 210-2 to have the same length, and the unfolded shape of the upper structure is not limited to a square. Specifically, the unfolded shape of the upper structure may be a rhombus shape or a 2N-sided polygonal shape (N being an integer equal to or larger than 2).

The 2N-sided polygonal unfolded shape (N being an integer equal to or larger than 2) can be achieved with the upper structure including 2N upper rods, 2N first coupling means 220, and 2N rotation means 240. The rotation mean 240 needs not to be provided when the upper rod 210-2 divided into the first upper rod 210A and the second upper rod 210B is used as the upper rod.

When the 2N-sided polygonal unfolded shape (N being an integer equal to or larger than 2) is employed, the sheet also has the shape with 2N corners (N being an integer equal to or larger than 2). The upper structure to support a heavy member or the like may include, instead of the sheet 250, a planar plate with high rigidity, made of metal, wood, or the like, serving as a supporting plate.

Figure 36:
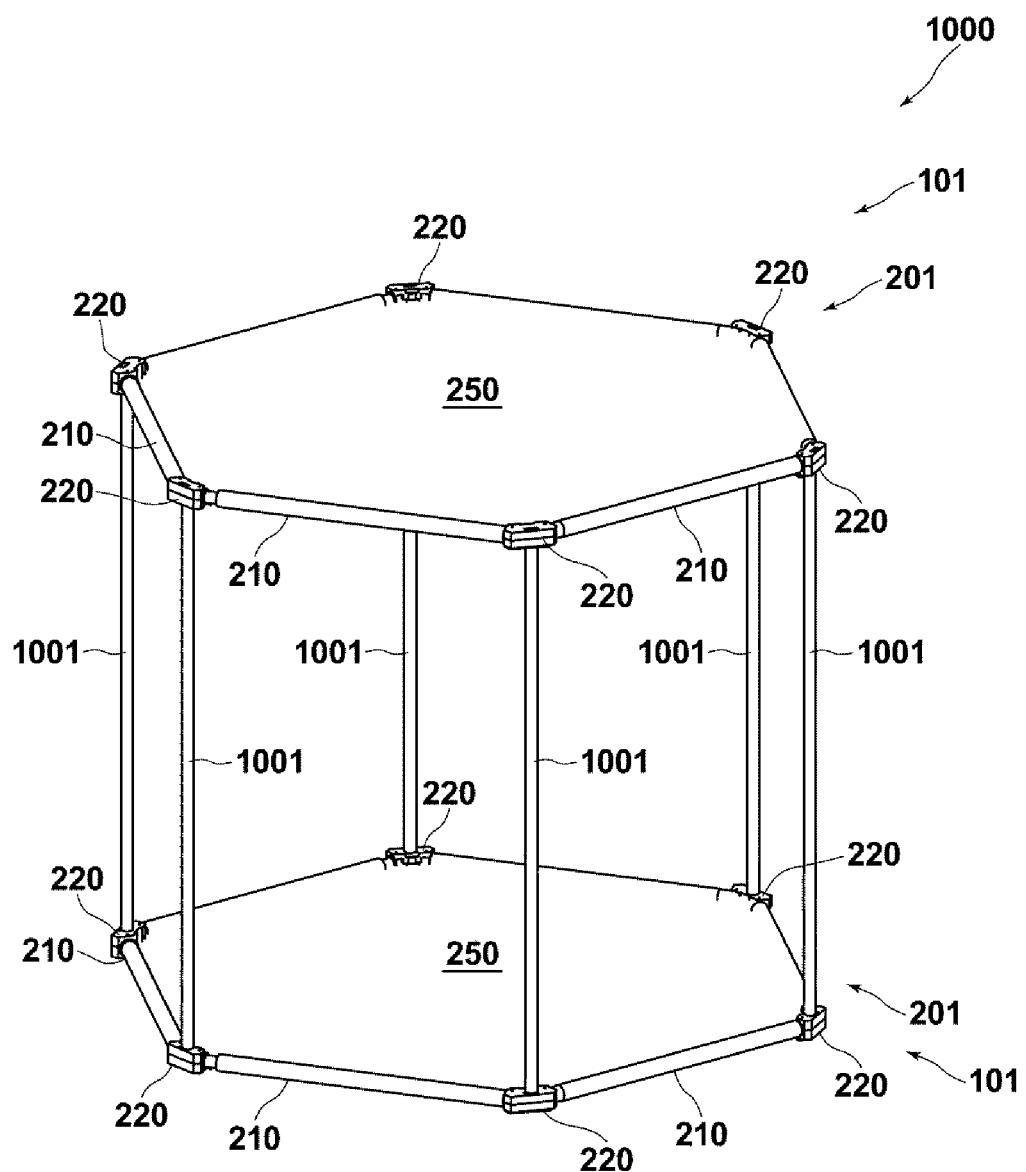
FIG. 36 is a perspective view of a structure according to the present invention.

Next, a structure 1000 including two frame structures according to the present invention is described in detail below with reference to a drawing. FIG. 36 is a perspective view of the structure 1000. The structure 1000 according to the present embodiment employs a mode using the second frame structure 101 provided with the sheet 250. However, the present invention is not limited to this. The frame structure 100, the third frame structure 102, the fourth frame structure 103, and the fifth frame structure 104 may be employed, and a frame structure not provided with the sheet 250 may also be employed.

As illustrated in FIG. 36, the structure 1000 includes two frame structures 101, each including the upper structure 201, separated from each other in a direction orthogonal to the plane including the regular hexagonal shape, that is, arranged on the upper and lower sides. Six struts 1001 are each detachably coupled and fixed to a corresponding one of the apices of the regular hexagonal shape of the upper and the lower frame structures 101. In the present embodiment, the struts 1001 are coupled to and fixed to the first coupling means 220.

The strut 1001 has both ends detachably coupled and fixed to the first coupling means 220 of the frame structure 101 positioned on the upper and lower sides. In the assembled state illustrated in FIG. 36, the struts 1001 rigidly maintain the regular hexagonal shape of the two frame structures 101. Thus, the struts 1001 can securely and rigidly support the frame structures 101. The frame structure 101 can be folded into a single column shape in the manner described above after both ends of the struts 1001 are detached from the first coupling means 220 of the two frame structures 101, and thus can be in a compact storage state to be carried around.

The strut 1001 is an elongated columnar member having a circular cross-sectional shape. The cross-sectional shape of the strut 1001 is not particularly limited, and may be an elliptical shape, a rectangular shape, or the like for example. The strut 1001 may be a solid member or a hollow member such as a pipe for example. The material of the strut 1001 is not limited as long as the material has rigidity. For example, a material such as metal, wood, and resin may be used. The length and the thickness of the strut 1001 are changed in accordance to an application, and thus are not particularly limited. The strut may be designed to be extendable and contractible, and may be designed to have the same length as the upper rod 210 in the contracted state to have the same length as the frame structure 101 in the folded state. Thus, the entire structure including the struts 1001 can be folded into a single columnar shape, whereby higher portability can be achieved.

The structure 1000 according to the present embodiment includes the two frame structures 101 consisting of the upper structures 201 defining the regular hexagonal shape. However, the structure according to the present invention is not limited to this. Specifically, two frame structures 104 consisting of the upper structures 204 forming a square, two frame structures consisting of the upper structures 204 forming a regular octagonal shape or a regular dodecagonal shape may be employed, and thus the structure can be changed as appropriate. The structure may include two frame structures consisting of upper structures of different sizes. In this configuration, the struts are diagonally arranged, instead of being orthogonal to the ground. The structure may include two frame structures consisting of upper structures of different shapes. For example, the upper structure of the frame structure positioned on the upper side may define a square, and the upper structure of the frame structure positioned on the lower side may define a regular hexagonal shape. In such a configuration, two struts are coupled to and fixed to two of the apices of the square.

The structure may include three or more frame structures instead of two frame structures. For example, the structure 1000 illustrated in FIG. 36 may be further provided with another frame structure 101 above the frame structure 101 on the upper side. In this configuration, the strut 1001 may be coupled and fixed to the apices of the regular hexagonal shape formed by the upper structure 201 of the newly added frame structure 101 and the apices of the regular hexagonal shape formed by the upper structure 201 of the frame structure 101 positioned at the middle to each other. The coupling and fixing may be achieved in a manner similar to that employed for the upper structures 201 of the two frame structures 101 at the lower side and at the middle.

The structure according to the present invention may have an unillustrated side surface sheet provided to each plane defined by the two frame structures and the struts. The side surface sheet is preferably detachably suspended across one of the upper rod and the struts or both. The material of the side surface sheet is not particularly limited and may be cloth or resin such as nylon or vinyl. The side surface sheet is not particularly limited to a flexible sheet, and may be in a plate form. The sheet for the structure for outdoor use is preferably water proofed.

The structure according to the present invention may include a plurality of securely and rigidly supported supporting plates, sheets, and the like arranged along a direction orthogonal to the plane with 2N corners formed by the upper rods. Thus, the structure according to the present invention can be used for various applications such as a tent. For example, the number of frame structures may be changed in accordance with the number of users, whereby higher usability can be achieved. The structure according to the present invention may have the struts detached from the frame structures, so that each of the frame structure as a whole can be folded into a columnar shape, whereby the structure as a whole can be in the compact storage state to be easily carried around.

The frame structure according to the present invention is not particularly limited to the embodiments described above, and may be changed as appropriate without departing the gist of the present invention. The frame structure according to the present invention can be applied to various fields including: a base of an architecture or a structure; a base or a roof of a simple temporary housing; a space antenna; a base of a solar panel; recreational equipment such as a tent and a trampoline; and a furniture such as a table and chairs. The structure including the flexible sheet 250 may be used as a hammock, a makeshift bed used during disasters, and a roof of a temporary housing.

REFERENCE SIGNS LIST

100, 101, 102, 103, 104, 500 frame structure
200, 201, 202, 600 upper structure
210, 210-2, 610 upper rod
220, 220-2, 620 first coupling mean (coupling mean)
230, 630 second coupling mean
240, 640 rotation mean
250, 650 sheet
300, 700 intermediate structure
310, 710 intermediate rod
320 third coupling mean
800 strut structure
810 upper rod
820 lower rod
830 string material
840 tension lever (tension application mean)
850A upper string material (second string material)
850B lower string material (second string material)
1000 structure
1001 strut

The invention claimed is:

1. A foldable frame structure that is unfoldable into a planar 2N-sided polygonal shape, the frame structure comprising:
   2N rods having an equal length and coupled to each other, the rods defining the planar 2N-sided polygonal shape, N being an integer equal to or larger than 2;
   coupling units that each include a pair of first main bodies, the first main bodies having notches, each of the coupling units disposed at a respective apex of the 2N-sided polygonal shape and couples a pair of the rods that are adjacent at the apex, the adjacent pair of rods at one of the apexes having end portions housed in the notches of the coupling unit disposed at the apex, the notches housing the end portions of the adjacent pair of rods such that each of the rods of the adjacent pair is rotatable about an orthogonal axis that is orthogonal to axes of both of the rods of the adjacent pair; and
   rotation units that enable each of the rods to rotate about the axis of the rod relative to at least one of two of the coupling units that hold both of the end portions of the rod, wherein
   the frame structure as a whole is foldable into a columnar shape with the rods pivoted about the orthogonal axis to minimize an angle between two adjacent ones of the rods while rotating about the axis.

2. A structure, comprising:
   a plurality of the frame structures according to claim 1 arranged at intervals in a direction orthogonal to a plane including the 2N-sided polygonal shape; and
   a plurality of struts coupling and fixing apices of the 2N-sided polygonal shapes of two adjacent ones of the frame structures to each other.

3. The frame structure according to claim 1, wherein one of the pair of first main bodies includes a pair of the notches housing the end portion of one of the rods, and a columnar protrusion protrudes in a direction parallel to the orthogonal axis from a bottom surface of one of the pair of the notches,
   the end portion housed in the pair of the notches includes a semicircular tip, a through hole having substantially the same diameter as the columnar protrusion formed at a center of the semicircle of the semicircular tip, and
   the pair of the notches include a curved surface having a curvature of radius that is equivalent to a diameter of the semicircle and a flat surface that continues from both sides of the curved surface.

4. The frame structure according to claim 1, further comprising:
- a flexible 2N-sided polygonal sheet having a substantially same size as the 2N-sided polygonal shape, wherein the sheet has sides suspended across the rods.

5. A structure, comprising:
- a plurality of the frame structures according to claim 4 arranged at intervals in a direction orthogonal to a plane including the 2N-sided polygonal shape; and
- a plurality of struts coupling and fixing apices of the 2N-sided polygonal shapes of two adjacent ones of the frame structures to each other.

* * * * *